United States Patent
Bhujabal et al.

(10) Patent No.: US 11,891,905 B2
(45) Date of Patent: Feb. 6, 2024

(54) BEARING SUPPORT ASSEMBLY

(71) Applicant: General Electric Company, Schenectady, NY (US)

(72) Inventors: Prashant Bhujabal, Bengaluru (IN); Ravindra Shankar Ganiger, Bengaluru (IN); Narayanan Payyoor, Thrissur (IN); Mohankumar Banakar, Bengaluru (IN); Weize Kang, Mason, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/644,475

(22) Filed: Dec. 15, 2021

(65) Prior Publication Data
US 2023/0061131 A1 Mar. 2, 2023

(30) Foreign Application Priority Data

Sep. 2, 2021 (IN) .............................. 202111039755

(51) Int. Cl.
*F01D 25/16* (2006.01)
*F01D 5/06* (2006.01)
*F02C 7/06* (2006.01)

(52) U.S. Cl.
CPC ............. *F01D 25/162* (2013.01); *F01D 5/06* (2013.01); *F02C 7/06* (2013.01); *F05D 2240/54* (2013.01); *F05D 2240/61* (2013.01); *F05D 2260/40311* (2013.01)

(58) Field of Classification Search
CPC ........ F02C 7/06; F01D 25/162; F01D 25/164; F01D 5/06; F05D 2240/54; F16C 27/04; F16C 2360/23; F04D 29/056; F04D 29/0563
See application file for complete search history.

(56) References Cited

U.S. PATENT DOCUMENTS

| | | | |
|---|---|---|---|
| 4,027,931 A | 6/1977 | Streifert | |
| 4,451,110 A | 5/1984 | Forestier et al. | |
| 4,872,767 A | 10/1989 | Knapp | |
| 6,682,219 B2 | 1/2004 | Alam et al. | |
| 7,546,742 B2 | 6/2009 | Wakeman et al. | |
| 7,731,426 B2 | 6/2010 | Meacham et al. | |
| 8,182,156 B2* | 5/2012 | Kinnaird | F02C 7/06 384/535 |
| 8,662,756 B2 | 3/2014 | Care et al. | |

(Continued)

OTHER PUBLICATIONS

Prior Art Database, "Non-Axisymmetric Support Design for Improved Engine Dynamics," published Mar. 14, 2019, accessed via <priorart.ip.com/IPCOM/000257836/NON-AXISYMMETRIC-SUPPORT-DESIGN-FOR-IMPROVED-ENGINE-DYNAMICS>.

*Primary Examiner* — Christopher Verdier
*Assistant Examiner* — Ryan C Clark
(74) *Attorney, Agent, or Firm* — Venable LLP; Elizabeth C. G. Gitlin; Michele V. Frank

(57) ABSTRACT

A bearing support assembly to support one or more bearings on a shaft. The bearing support assembly includes a bearing support frame configured to be coupled to a static frame, a plurality of ribs connected to the bearing support frame, and a bearing support connected to the plurality of ribs and configured to support a bearing of the one or more bearings. The bearing support assembly has a non-axisymmetric stiffness around a circumference of the bearing support assembly.

20 Claims, 20 Drawing Sheets

(56) References Cited

U.S. PATENT DOCUMENTS

| | | | |
|---|---|---|---|
| 9,109,622 B2 | 8/2015 | Meacham et al. | |
| 10,001,028 B2* | 6/2018 | Ganiger | F01D 25/16 |
| 10,197,102 B2 | 2/2019 | Ghosh et al. | |
| 10,274,017 B2 | 4/2019 | Ganiger et al. | |
| 10,584,751 B2 | 3/2020 | Ghosh et al. | |
| 10,794,222 B1 | 10/2020 | Ganiger et al. | |
| 10,823,228 B2 | 11/2020 | Ganiger et al. | |
| 10,968,775 B2 | 4/2021 | Ghosh et al. | |
| 11,021,997 B2* | 6/2021 | McCune | F01D 15/12 |
| 2008/0152483 A1* | 6/2008 | Godleski | F01D 25/164 |
| | | | 415/142 |
| 2008/0267766 A1* | 10/2008 | Meacham | F16C 27/04 |
| | | | 415/170.1 |
| 2016/0327098 A1* | 11/2016 | Long, Jr. | F16C 27/04 |
| 2018/0051706 A1* | 2/2018 | DiBenedetto | F16C 33/6637 |
| 2018/0112554 A1* | 4/2018 | Ghosh | F16C 35/067 |
| 2018/0128342 A1* | 5/2018 | Ghosh | F16C 27/045 |
| 2018/0298822 A1* | 10/2018 | Ac | F16C 19/26 |
| 2019/0178104 A1 | 6/2019 | Joshi et al. | |
| 2019/0323555 A1* | 10/2019 | Smedresman | F16C 33/66 |
| 2019/0353051 A1* | 11/2019 | Ganiger | F01D 25/164 |
| 2019/0353052 A1* | 11/2019 | Ganiger | F01D 25/164 |
| 2020/0096041 A1* | 3/2020 | Wojtyczka | F16C 27/02 |
| 2020/0300302 A1* | 9/2020 | Aury | F01D 25/005 |
| 2021/0040865 A1 | 2/2021 | Ganiger et al. | |
| 2021/0047940 A1 | 2/2021 | Ganiger et al. | |
| 2021/0213520 A1* | 7/2021 | Coudert | F16C 33/586 |
| 2021/0348522 A1* | 11/2021 | Demitraszek, Sr. | F01D 25/164 |

* cited by examiner

BEARING SUPPORT ASSEMBLY

CROSS REFERENCE TO RELATED APPLICATIONS

The present application claims the benefit of Indian Patent Application No. 202111039755, filed on Sep. 2, 2021, which is hereby incorporated by reference herein in its entirety.

TECHNICAL FIELD

The present disclosure relates to bearing support assemblies for a compressor section of an engine.

BACKGROUND

Gas turbine engines include rotating shafts for rotation of various coupled components. For example, gas turbine engines include high pressure shafts for driving high pressure compressors and low pressure shafts for driving low pressure compressors. The shafts are supported within the compressor section via a plurality of bearings. A bearing support assembly supports the bearings about the shaft.

BRIEF DESCRIPTION OF THE DRAWINGS

Features and advantages of the present disclosure will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Features, advantages, and embodiments of the present disclosure are set forth or apparent from a consideration of the following detailed description, drawings, and claims. Moreover, it is to be understood that the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and scope of the present disclosure.

The bearing support assembly of the present disclosure may allow for varying the stiffness of the bearing support assembly in a 360° arrangement around the circumference of the bearing support assembly. This may allow for bearings in an X-axis direction (e.g., a three o'clock position and a nine o'clock position) to have a first support stiffness and the bearings in a Y-axis direction (e.g., a twelve o'clock position and a six o'clock position) to have a second support stiffness. The support of the bearings, characterized by the stiffness of the bearing assembly, may be varied between the X-axis and Y-axis positions, may be constant between the X-axis and Y-axis positions, and/or may be varied continuous around the circumference of the bearing support. The stiffness may be continuously varying for all operating ranges and/or may be a function of load applied to the bearing assembly. The stiffness of the bearing support assembly may be varied through material, construction, orientation, thickness, shape, inclusion of gaps, orientation of ribs, etc., and any combination thereof. The stiffness of the bearing support assembly may be non-symmetric always or at predetermined loads.

Figure 1:
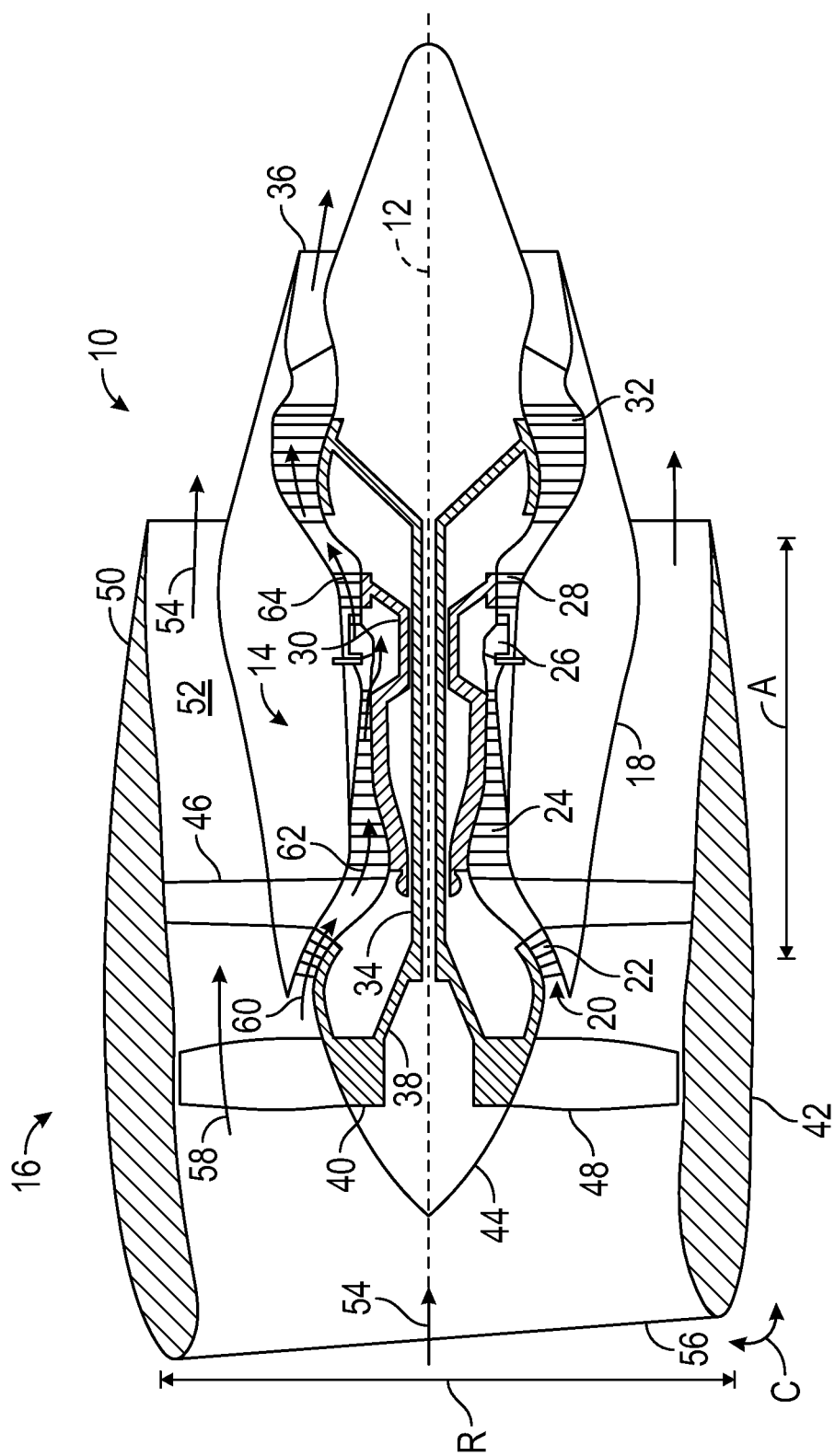
FIG. 1 shows a schematic, cross-sectional view of an engine, taken along a centerline of the engine, according to an embodiment of the present disclosure.

Referring to FIG. 1 an engine 10 has a longitudinal, axial centerline 12 extending therethrough along an axial direction A. The engine 10 defines a radial direction R extending perpendicular from the centerline 12 and a circumferential direction C (shown in/out of the page in FIG. 1) extends perpendicular to both the centerline 12 and the radial direction R. The engine 10 may be, for example, but not limited to, a gas turbine engine, a turbofan engine, an open rotor engine, a turboshaft engine, turbojet engine, or a turboprop configuration engine, including marine and industrial turbine engines and auxiliary power units.

The engine 10 includes a core engine 14 and a fan section 16 positioned upstream thereof. The core engine 14 generally includes an outer casing 18 that defines an annular inlet 20. In addition, the outer casing 18 may further enclose and support a low pressure compressor 22 for increasing the pressure of the air that enters the core engine 14 to a first pressure level. A multi-stage, axial-flow high pressure compressor 24 may then receive the pressurized air from the low pressure compressor 22 and further increase the pressure of such air. The pressurized air exiting the high pressure compressor 24 may then flow to a combustor 26 within which fuel is injected into the flow of pressurized air, with the resulting mixture being combusted within the combustor 26. High energy combustion products 64 are directed from the combustor 26 along the hot gas path of the engine 10 to a high pressure turbine 28 for driving the high pressure compressor 24 via a high pressure shaft 30, also referred to as a shaft 30, and, then, to a low pressure turbine 32 for driving the low pressure compressor 22 and fan section 16 via a low pressure shaft 34 that is generally coaxial with high pressure shaft 30. After driving each of the high pressure turbine 28 and the low pressure turbine 32, the combustion products 64 may be expelled from the core engine 14 via an exhaust nozzle 36 to provide propulsive jet thrust.

Additionally, as shown in FIG. 1, the fan section 16 of the engine 10 includes a rotatable, axial-flow fan rotor 38 configured to be surrounded by an annular nacelle 42. In particular embodiments, the low pressure shaft 34 may be connected directly to the fan rotor 38 or a rotor disk 40, such as in a direct-drive configuration. In alternative configurations, the low pressure shaft 34 may be connected to the fan rotor 38 via a speed reduction device such as a reduction gear gearbox in an indirect-drive or geared-drive configuration. Such speed reduction devices may be included between any suitable shafts/spools within the engine 10 as desired or required. Additionally, the fan rotor 38 and/or rotor disk 40 may be enclosed or formed as part of a fan hub 44.

The nacelle 42 may be configured to be supported relative to the core engine 14 by a plurality of substantially radially-extending, circumferentially-spaced outlet guide vanes 46. As such, the nacelle 42 may enclose the fan rotor 38 and a plurality of fan blades 48. Each of the fan blades 48 may extend between a root and a tip in the radial direction R relative to the centerline 12. A downstream section 50 of the nacelle 42 may extend over an outer portion of the core engine 14 so as to define a secondary airflow or bypass conduit 52 that provides additional propulsive jet thrust.

During operation of the engine 10, an initial air flow 54 may enter the engine 10 through an inlet 56 of the nacelle 42. The air flow 54 then passes through the fan blades 48 and splits into a first compressed air flow 58 that moves through the bypass conduit 52 and a second compressed air flow 60 that enters the low pressure compressor 22. The pressure of the second compressed air flow 60 is then increased and enters the high pressure compressor 24 as air flow 62. After mixing with fuel and being combusted within the combustor 26, the combustion products 64 exit the combustor 26 and flow through the high pressure turbine 28. Thereafter, the combustion products 64 flow through the low pressure turbine 32 and exit the exhaust nozzle 36 to provide thrust for the engine 10.

Figure 2A:
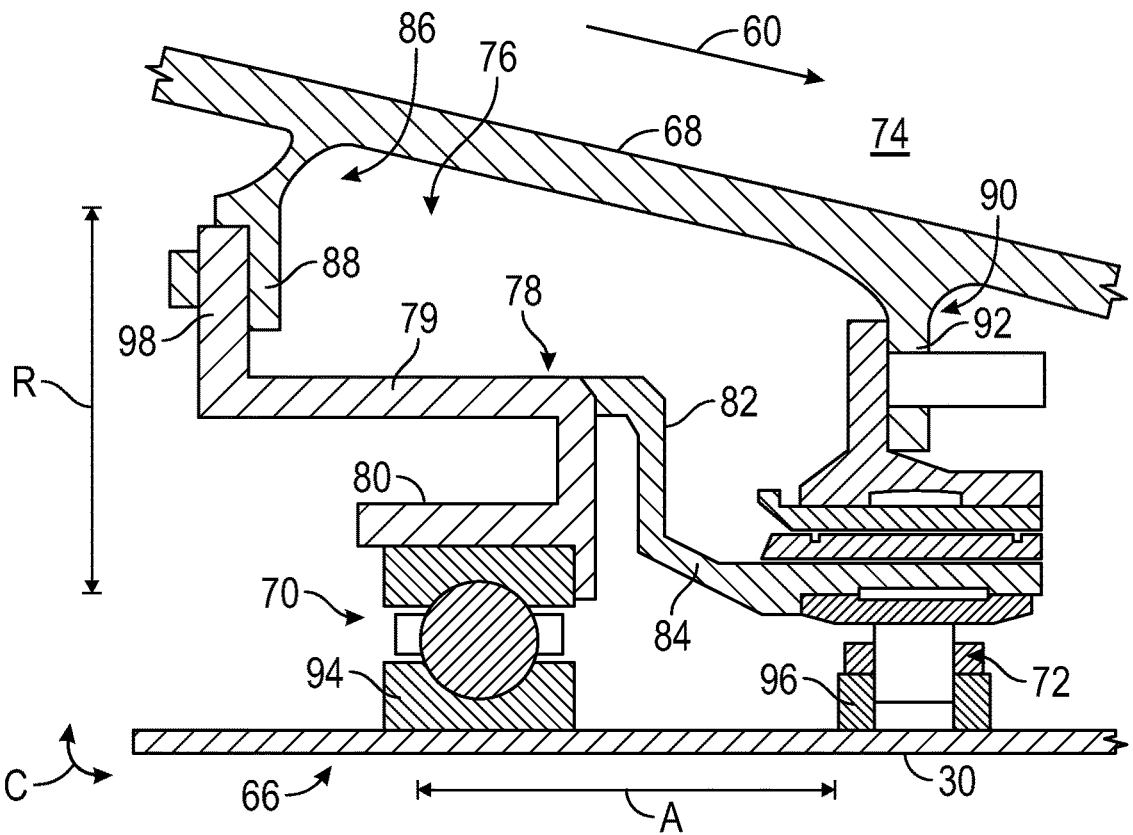
FIG. 2A shows a schematic, partial cross-sectional view of a bearing support assembly with bearings and a shaft for use in an engine, taken along a centerline of the engine, according to an embodiment of the present disclosure.
Figure 2B:
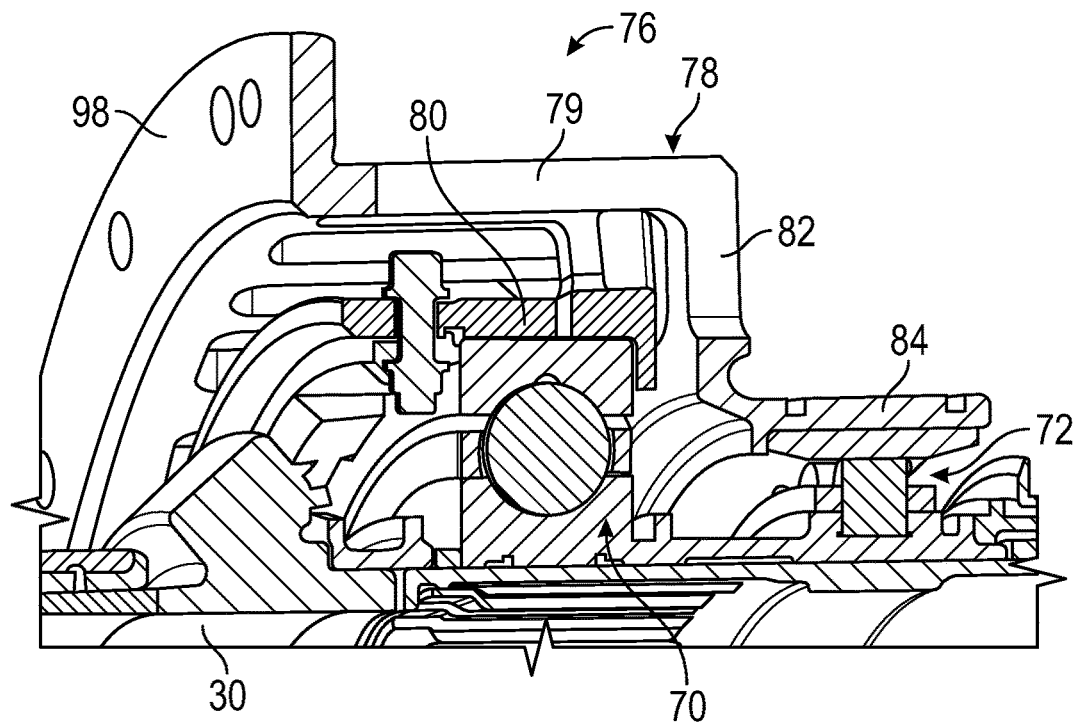
FIG. 2B shows a schematic, partial perspective cross-sectional view of the bearing support assembly of FIG. 2A, taken along a centerline of the engine, according to an embodiment of the present disclosure.

FIG. 2A shows a close-up view of a cross section of the compressor section of the engine 10 (FIG. 1). FIG. 2B shows a perspective view of the close-up view of the compressor section of the engine 10 (FIG. 1). Referring to both FIGS. 2A and 2B, a forward end 66 of the high pressure shaft 30 is positioned within the compressor section of the engine 10, radially inward of a core air flow path 74 for the second compressed air flow 60 flowing through the core engine 14 (FIG. 1). The core air flow path 74 is defined at least in part by a static frame 68 within the compressor section of the engine 10. The static frame 68 may be a single piece unit or may be formed of a plurality of members attached together.

With continued reference to FIGS. 2A and 2B, the engine 10 includes a bearing supporting rotation of the high pressure shaft 30 at the forward end 66. For example, the engine 10 includes a forward bearing 70 and an aft bearing 72. Although shown at the forward end 66 of the high pressure shaft 30, the forward bearing 70 and/or the aft bearing 72 may be included at any other position along the high pressure shaft 30, along the low pressure shaft 34 (FIG. 1), or any other suitable rotating shaft of the engine 10 or other suitable gas turbine engine.

FIGS. 2A and 2B show a bearing support assembly 76 for supporting the forward bearing 70, the aft bearing 72, or both the forward bearing 70 and the aft bearing 72. The bearing support assembly 76 may include a frame 98, which may be a bearing support frame, coupled to a plurality of individual beams or ribs 78. The ribs 78 may be spaced along a circumferential direction C of the frame 98 (see, for example, FIG. 5). Each of the ribs 78 may include an axial portion 79 that extends in the axial direction A. Coupled to each of the axial portions 79 of the ribs 78 may be a forward bearing support rib 80 and an aft bearing support rib 82. The forward bearing support ribs 80 and the aft bearing support ribs 82 may extend in the radial direction R inward from the axial portion 79. Additionally, the aft bearing support ribs 82 may include an axial member 84 extending generally along the axial direction A for supporting the aft bearing 72. The bearing support 76 is attached to the static frame 68 at a first location 86 via a first attachment flange 88 and at a second location 90 via a second attachment flange 92. The bearing support 76 may be referred to as a "squirrel casing" or "squirrel cage" for the forward bearing 70 and the aft bearing 72.

With continued reference to FIGS. 2A and 2B, the bearing support assembly 76 may support the forward bearing 70, the aft bearing 72, or both the forward bearing 70 and the aft bearing 72 in their respective bearing races adjacent the high pressure shaft 30. For example, the bearing support assembly 76 may support the forward bearing 70 within a forward bearing race 94. The support may be provided by the forward bearing support ribs 80. The bearing support assembly 76 may support the aft bearing 72 within an aft bearing race 96. The support may be provided by the aft bearing support ribs 82.

The bearing support assembly 76 may have a stiffness selected to support the forward bearing 70 and/or the aft bearing 72. For example, the bearing support 76, the ribs 78, the axial portion 79, the forward bearing support ribs 80, the aft bearing support ribs 82, the frame 98, any portion thereof, or any combination thereof may be designed, sized, dimensioned, oriented, or shaped to provide a particular or predetermined stiffness to the respective bearing.

Figure 3A:
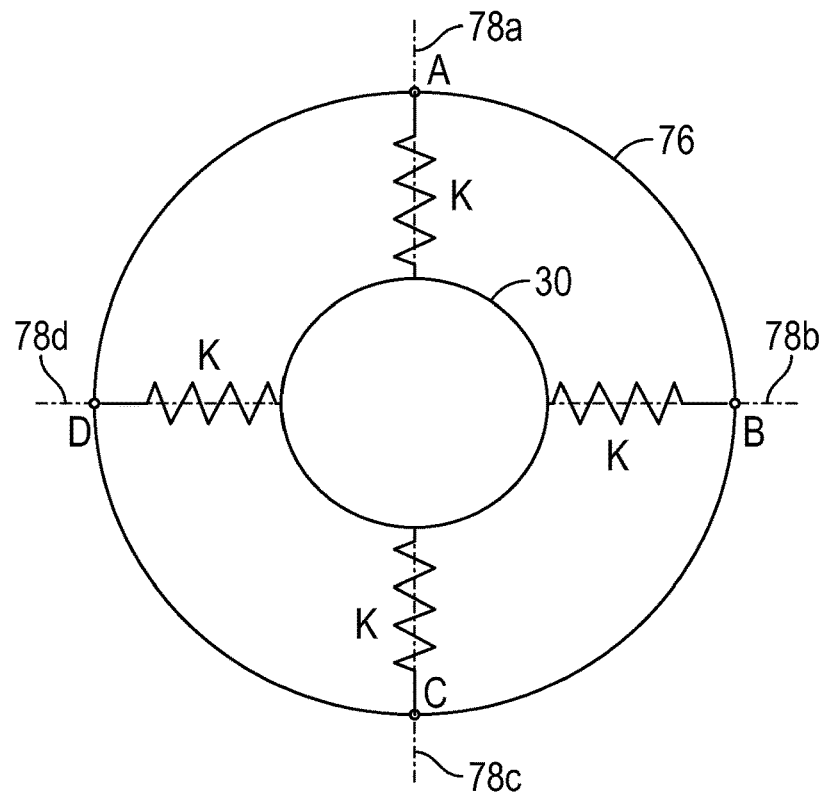
FIG. 3A shows a schematic view describing the stiffness of a bearing support assembly, according to an embodiment of the present disclosure.
Figure 3B:
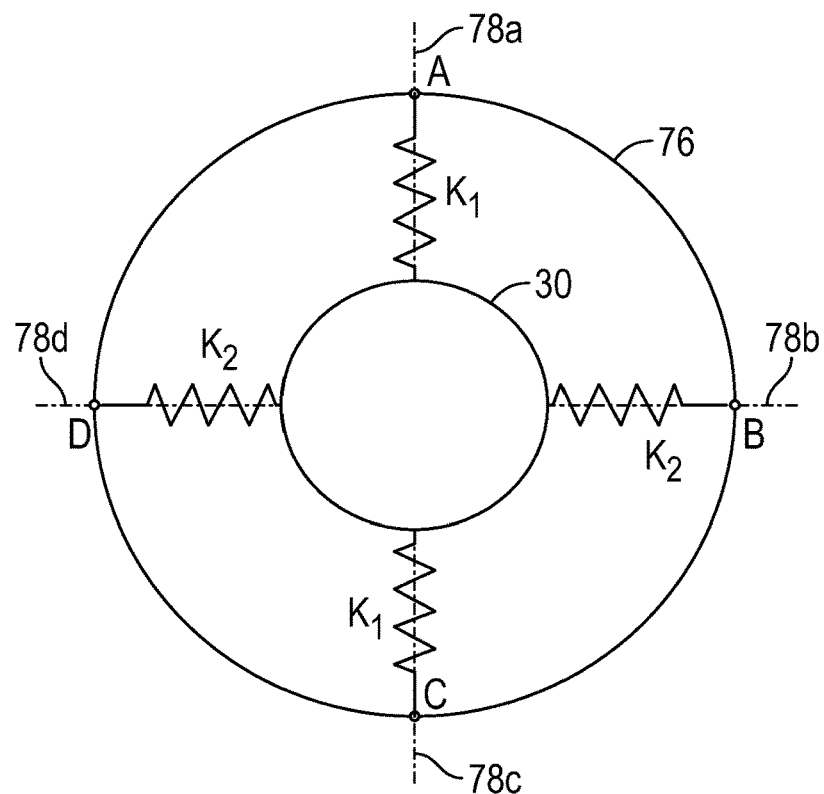
FIG. 3B shows a schematic view describing the stiffness of a bearing support assembly, according to an embodiment of the present disclosure.

In some examples, the stiffness of the bearing support assembly 76 may be constant around the circumference of the bearing support assembly 76. In some examples, the stiffness may vary around the circumference of the bearing support assembly. For example, referring to FIGS. 3A and 3B, the bearing support assembly 76 may be supported by a rib 78a located at the twelve o'clock position (point A), a rib 78b located at the three o'clock position (point B), a rib 78c located at the six o'clock position (point C), and a rib 78d located at the nine o'clock position (point D). In FIG. 3A, the stiffness K may be constant around the circumference of the bearing support assembly 76. In FIG. 3B, the stiffness may vary at different points around the circumference of the bearing support assembly 76. For example, at point A and point C, the bearing support assembly 76 may have a first stiffness $K_1$ and at point B and point D, the bearing support assembly 76 may have a second stiffness $K_2$. The first stiffness $K_1$ and the second stiffness $K_2$ may be different. In some examples, the stiffness may additionally, or alternatively, vary between adjacent points (e.g., between points A and B, etc.), may vary between points and be identical at points, may be constant between points, or combinations thereof.

Figure 4A:
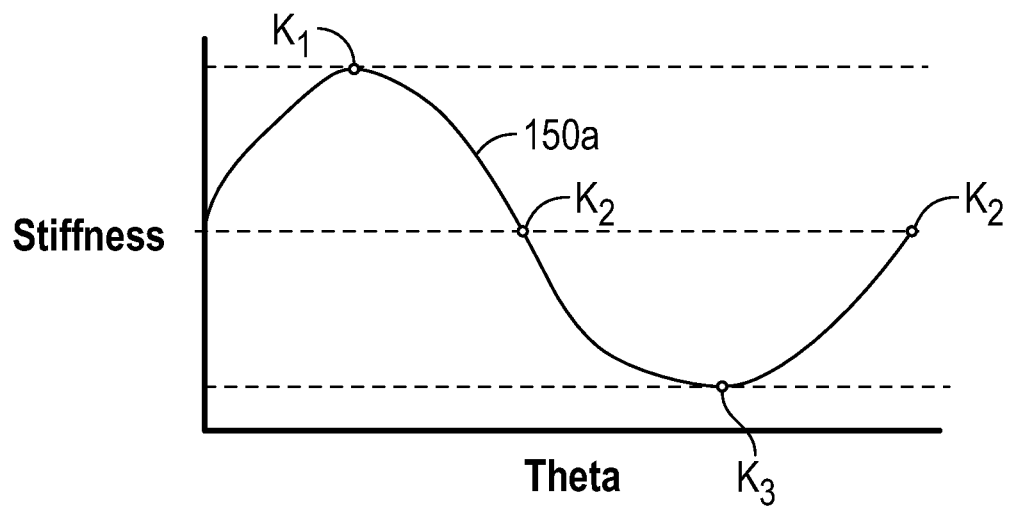
FIG. 4A shows a graph of the stiffness of a bearing support assembly around the circumference of the bearing support, according to an embodiment of the present disclosure.

Some exemplary variations of stiffness around the circumference of the bearing support assembly are shown in FIGS. 4A to 4D. For example, in FIG. 4A, the bearing support assembly may have a stiffness represented by a curve 150a. That is, at a first point, $K_1$, around the circumference of the bearing support assembly, the bearing support assembly may provide a first stiffness, at a second point, $K_2$, around the circumference of the bearing support assembly, the bearing support assembly may provide a second stiffness, at a third point, $K_3$, around the circumference of the bearing support assembly, the bearing support assembly may provide a third stiffness, and at a fourth point, $K_2$, around the circumference of the bearing support assembly, the bearing support assembly may again provide the second stiffness. In some examples, the first point $K_1$ may be located at twelve o'clock position (e.g., point A in FIG. 3A), the second point $K_2$ may be located at a three o'clock position (e.g., point B in FIG. 3A), the third point $K_3$ may be located at a six o'clock position (e.g., point C in FIG. 3A), and the fourth point $K_2$ may be located at a nine o'clock position (e.g., point D in FIG. 3A). In this manner, the bearing support assembly may exhibit the highest stiffness $K_1$ at the twelve o'clock position and may exhibit the lowest stiffness $K_3$ at the six o'clock position. At the three o'clock position and the nine o'clock position, a mean stiffness $K_2$ is present. As shown in FIG. 4A, the stiffness may by constantly varied in a sinusoidal manner around the circumference of the bearing support assembly.

Figure 4B:
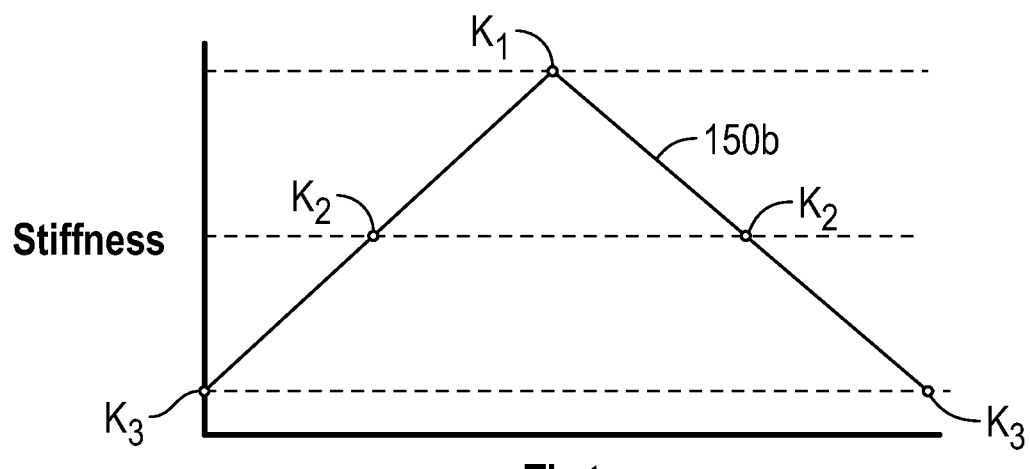
FIG. 4B shows a graph of the stiffness of a bearing support assembly around the circumference of the bearing support, according to an embodiment of the present disclosure.
Figure 4C:
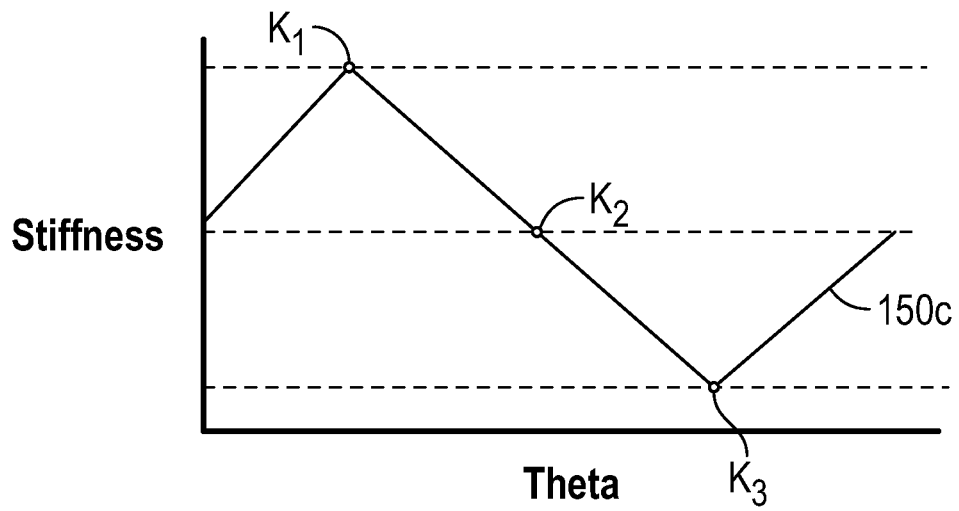
FIG. 4C shows a graph of the stiffness of a bearing support assembly around the circumference of the bearing support, according to an embodiment of the present disclosure.
Figure 4D:
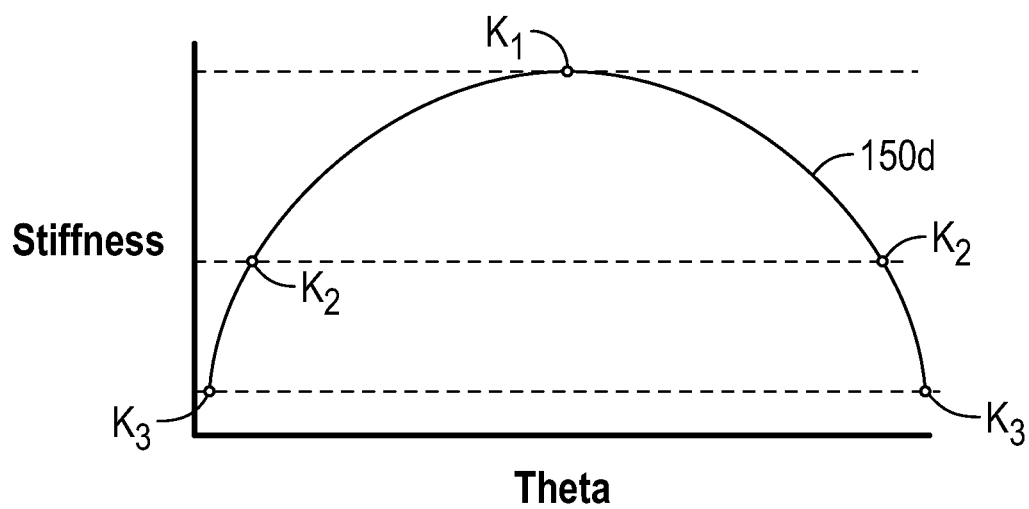
FIG. 4D shows a graph of the stiffness of a bearing support assembly around the circumference of the bearing support, according to an embodiment of the present disclosure.

In another example, shown in FIG. 4B, the stiffness of the bearing support assembly may vary in a linear manner around the circumference of the bearing support assembly as represented by a curve 150b. The highest stiffness $K_1$ may be exhibited at the twelve o'clock position and the lowest stiffness $K_3$ may be exhibited at the six o'clock position. A mean stiffness $K_2$ may be exhibited at the three o'clock and nine o'clock positions. In another example, shown in FIG. 4C, the stiffness of the bearing support assembly may vary in a linear manner around the circumference of the bearing support assembly as represented by a curve 150c. The highest stiffness $K_1$ may be exhibited at the twelve o'clock position and the lowest stiffness $K_3$ may be exhibited at the six o'clock position. The mean stiffness $K_2$ may be exhibited at other points around the circumference, such as, for example, the three o'clock position and the nine o'clock position. In another example, shown in FIG. 4D, the stiffness of the bearing assembly may vary in a spline or curve around the circumference of the bearing support assembly as represented by a curve 150d. The spline or curve may be a curve of polynomial order (e.g., second order, third order, or higher order). For example, the highest stiffness $K_1$ may be exhibited at the twelve o'clock position and the lowest stiffness $K_3$ may be exhibited at the six o'clock position. The mean stiffness $K_2$ may be exhibited at the three o'clock position and the nine o'clock position.

The examples of FIGS. 4A to 4D are merely exemplary and the stiffness of the bearing support assembly may be selected to vary in any location and in any pattern, array, or curve around the circumference of the bearing support assembly to achieve the desired support of the bearing assemblies. As can be seen in the present disclosure, for example, FIG. 5, additional ribs may be located between the depicted rib 78a, rib 78b, rib 78c, and rib 78d. The stiffness K at each of the ribs may be selected to provide a particular support of the high pressure shaft 30 by the bearing support assembly 76. The stiffness along the circumference of the bearing support 76 may be varied.

FIGS. 5 to 32 represent exemplary manners in which to vary the stiffness at a particular location, along a section of the circumference, and/or along the entire circumference of the bearing support assembly. Any of the exemplary manners to vary the stiffness may be combined with other manners of varying the stiffness as described herein. Any of the exemplary manners of FIGS. 5 to 32 may be varied in any of the manners described above, e.g., with respect to FIGS. 4A to 4D.

FIGS. 5 to 17C describe non-axisymmetric bearing support assemblies. The bearing support assemblies of FIGS. 5 to 17C may have a bearing support assembly that has a stiffness that is continuously varied for all operating ranges of an engine.

FIGS. 5 to 8 show an exemplary bearing support assembly 100. The bearing support assembly 100 includes a plurality of ribs 104 spaced circumferentially in a direction C around the bearing support assembly 100. The plurality of ribs 104 may be located between a frame 102, also referred to as a bearing support frame 102, and a bearing support 106. A first rib 104a may be located at the twelve o'clock position (point A), a second rib 104b may be located at the three o'clock position (point B), a third rib 104c may be located at the six o'clock position (point C), and a fourth rib 104d may be located at the nine o'clock position (point D). The bearing support assembly 100 may support a plurality of bearings 108 located around the shaft 30.

Figure 5:
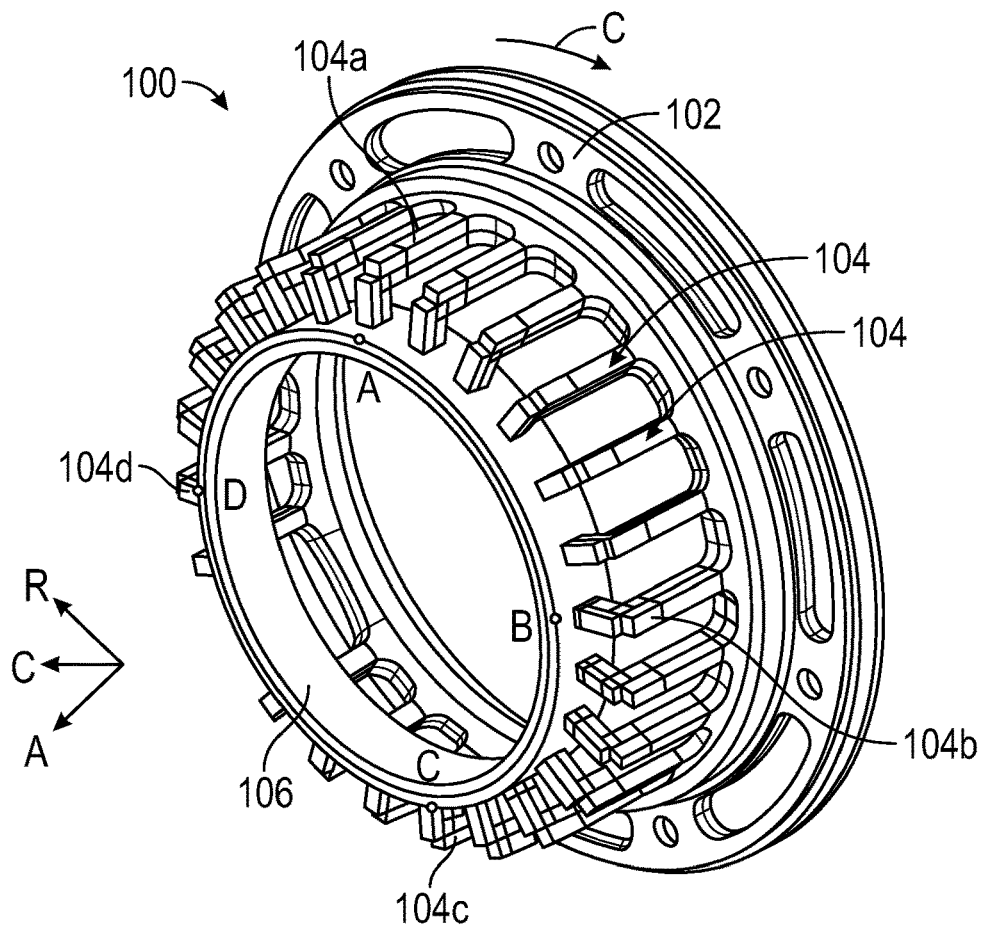
FIG. 5 shows a schematic, perspective view of a bearing support assembly, according to an embodiment of the present disclosure.
Figure 6:
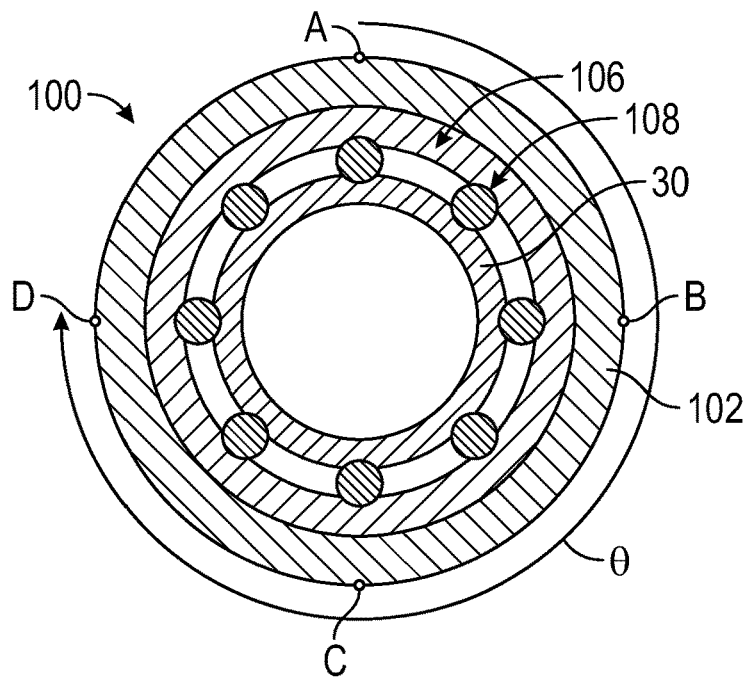
FIG. 6 shows a schematic, front end cross-sectional view of the bearing support assembly of FIG. 5 with bearings and a shaft, according to an embodiment of the present disclosure.
Figure 7:
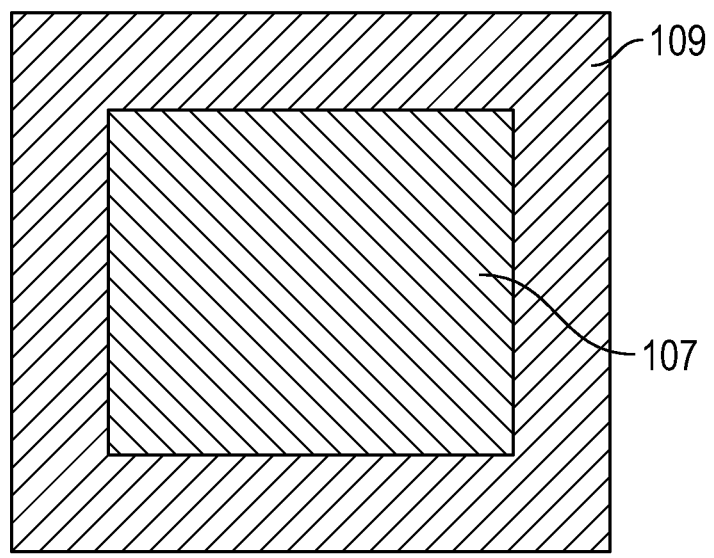
FIG. 7 shows a schematic, cross-sectional view of a rib of a bearing support assembly, taken along a plane extending in the radial direction, according to an embodiment of the present disclosure.

As described previously, a stiffness may be varied around the circumference of the bearing support assembly 100. In the example of FIGS. 5 to 7, the stiffness may be varied by altering or changing the material of the ribs 104. For example, the thickness of the ribs 104, the material of the ribs 104, and/or the cross section across the circumference of the bearing support may be varied around the circumference of the bearing support assembly 100 to vary the stiffness of the bearing support assembly 100.

Figure 8:
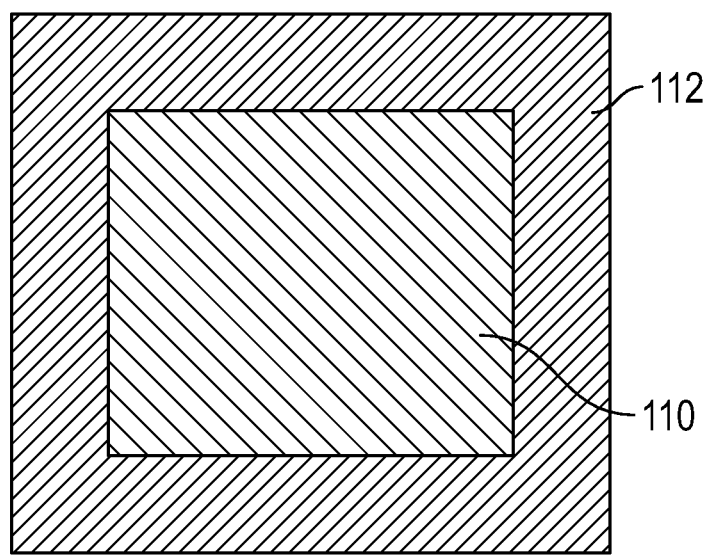
FIG. 8 shows a schematic, cross-sectional view of a rib of a bearing support assembly, taken along a plane extending in the radial direction, according to an embodiment of the present disclosure.

FIGS. 7 and 8 show bi-metallic beam arrangements for a variable elastic modulus of the ribs 104. That is, the ribs 104 may be formed of a base material that is coated in a secondary material to vary the stiffness of the ribs 104. The variation may come via the selection of the secondary coating material (e.g., higher strength for higher stiffness ribs 104 vs. lower strength materials for lower stiffness ribs 104 and/or higher Young's modulus for higher stiffness ribs 104 and a lower Young's modulus for lower stiffness ribs 104) or via the thickness of the applied coating (e.g., greater thickness for higher stiffness ribs 104 vs. lower thickness for lower stiffness ribs 104).

For example, referring to FIG. 7, each rib 104, a subset of ribs 104, or all ribs 104 may be formed of a first material 107 and a second material 109. The first material 107 may be steel and the second material 109 may be aluminum. Thus, the rib 104 may be formed of a steel base with an aluminum deposit therearound. In FIG. 8, each rib 104, a subset of ribs 104, or all ribs 104 may be formed of a first material 110 and a second material 112. The first material 110 may be steel and the second material 112 may be titanium. Thus, the rib 104 may be formed of a steel base with a titanium deposit therearound. The particular makeup of the rib 104 may be selected based on the desired stiffness at a particular location around the circumference of the bearing support assembly 100. For example, the materials of the arrangements shown in FIG. 8 may be selected to produce a higher stiffness than the materials of the arrangements shown in FIG. 7. In this manner, the rib of FIG. 8 may be selected when it is desired to have a higher stiffness and the rib of FIG. 7 may be selected when it is desired to have a lower stiffness. For example, first rib 104a and third rib 104c of FIG. 5 may be constructed as shown in FIG. 8 and the second rib 104b and fourth rib 104d of FIG. 5 may be constructed as shown in FIG. 7. Other arrangements of the materials of FIGS. 7 and 8 with respect to the ribs 104 of FIG. 5 may be selected. Other materials may be provided alone, or in combination, to provide a desired stiffness to the ribs 104. Such other materials may include, for example, but not limited to nickel, titanium, aluminum, or combinations thereof.

Figure 9:
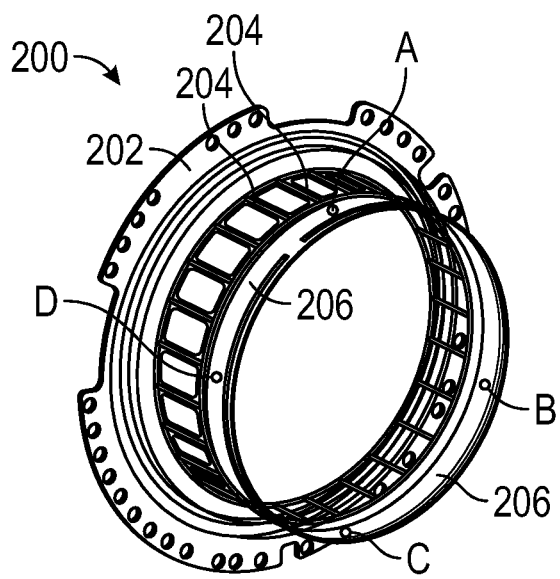
FIG. 9 shows a schematic, perspective view of a bearing support assembly, according to an embodiment of the present disclosure.
Figure 10A:
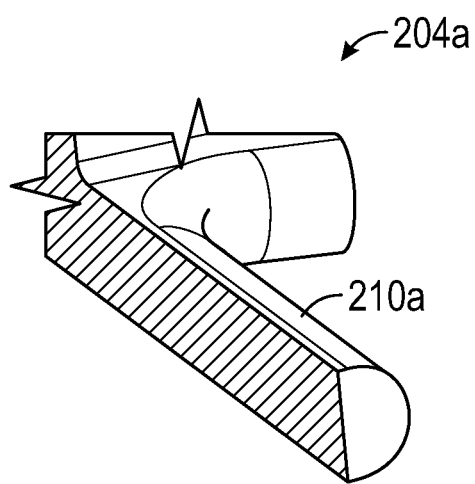
FIG. 10A shows a schematic, cross-sectional view of a rib of a bearing support assembly, taken along a centerline of the rib, according to an embodiment of the present disclosure.
Figure 10B:
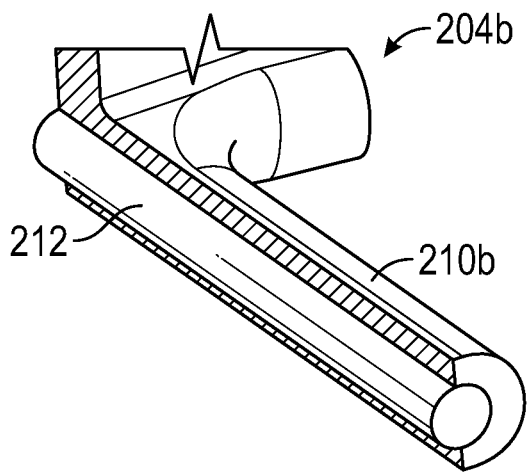
FIG. 10B shows a schematic, cross-sectional view of a rib of a bearing support assembly, taken along a centerline of the rib, according to an embodiment of the present disclosure.
Figure 10C:
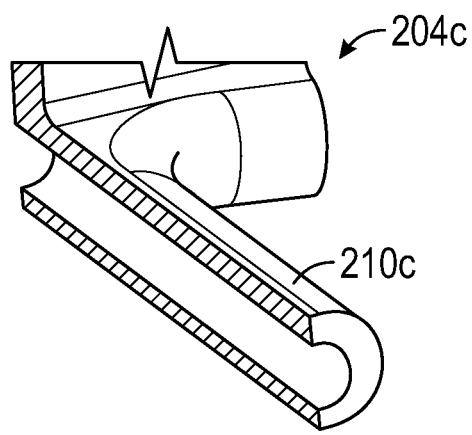
FIG. 10C shows a schematic, cross-sectional view of a rib of a bearing support assembly, taken along a centerline of the rib, according to an embodiment of the present disclosure.

FIGS. 9 to 10C show an exemplary bearing support assembly 200. The bearing support assembly 200 may by non-symmetric due to a hybrid arrangement of solid ribs, hollow ribs, and hollow-filled ribs. The bearing support assembly 200 includes a plurality of ribs 204 spaced circumferentially around the bearing support assembly 200. The plurality of ribs 204 may be located between a frame 202, also referred to as a bearing support frame 202, and a bearing support 206. Points A, B, C, and D, again represent the twelve o'clock position, the three o'clock position, the six o'clock position, and the nine o'clock position around the circumference of the bearing support assembly 200.

In the example of FIGS. 9 to 10C, the stiffness around the circumference of the bearing support assembly 200 may be varied by altering or changing the construction of the ribs 204. For example, the rib 204 may be solid, hollow, or hollow filled with a filler material. Any combination of the ribs of FIGS. 10A to 10C may be provided in a single bearing support assembly 200 to provide a desired stiffness at various points around the circumference of the bearing support assembly 200. A hybrid beam structure may be provided around the circumference of the bearing support assembly 200 by providing a combination of hollow ribs, solid ribs, and hollow-filled ribs.

For example, in FIG. 10A, a rib 204a may be a solid rib 210a. In FIG. 10B, a rib 204b may be a hollow-filled rib 210b. Within the hollow rib of the hollow-filled rib 210b may be a material 212. The material 212 may be a bi-metallic material. The hollow-filled rib 210b may be filled with the material 212 to vary the stiffness at different locations about the circumference of the bearing support assembly 200 (FIG. 9). The material 212 may be a high strength insert. In FIG. 10C, a rib 204c may be a hollow rib 210c.

Figure 12:
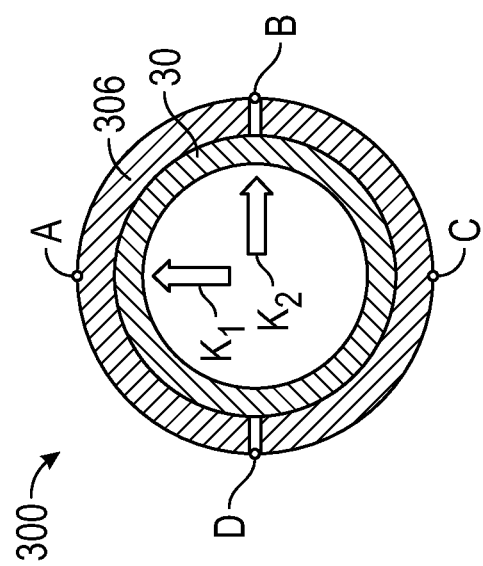
FIG. 12 shows a schematic, front end cross-sectional view of the bearing support assembly of FIG. 11, according to an embodiment of the present disclosure.
Figure 11:
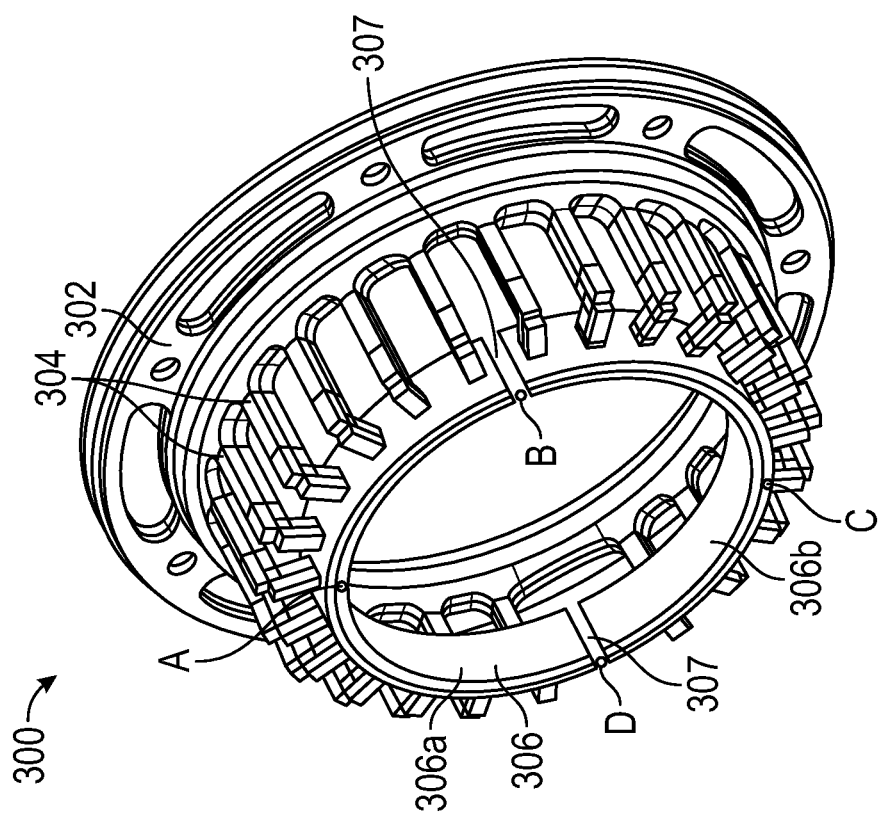
FIG. 11 shows a schematic, perspective view of a bearing support assembly, according to an embodiment of the present disclosure.

FIGS. 11 and 12 show an exemplary bearing support assembly 300. The bearing support assembly 300 may be non-symmetric due to a hoop cut of the bearing support ring. The bearing support assembly 300 includes a plurality of ribs 304 spaced circumferentially around the bearing support assembly 300. The plurality of ribs 304 may be located between a frame 302, also referred to as a bearing support frame 302, and a bearing support ring, also referred to as a bearing support 306. Points A, B, C, and D, again represent the twelve o'clock position, the three o'clock position, the six o'clock position, and the nine o'clock position around the circumference of the bearing support assembly 300. The bearing support assembly 300 may support a plurality of bearings (not shown) located around the shaft 30 and between the bearing support 306 and the shaft 30.

In the example of FIGS. 11 and 12, the stiffness around the circumference of the bearing support assembly 300 may be varied by altering or changing the construction of the bearing support 306. For example, the bearing support 306 may be a split bearing support having a first bearing support 306a and a second bearing support 306b. Located between a distal end of the first bearing support 306a and a distal end of the second bearing support 306b is a gap 307. The gap 307 may be aligned with the three o'clock position (point B) and the nine o'clock position (point D). Thus, the stiffness $K_2$ of the bearing support assembly 300 may be lower at the gap 307 than the stiffness $K_1$ at the first bearing support 306a and/or the second bearing support 306b. In this manner, the stiffness $K_1$ at point A and point C may be greater than the stiffness $K_2$ at point B and point D. The stiffness may decrease from point A as the bearing support 306 approaches the gap 307, which may be the lowest stiffness around the circumference of the bearing support 306. The gap 307 may be formed by a hoop cut in the bearing support 306 to form a split or segmented bearing support. The segmentation may be at multiple locations.

Referring to FIGS. 13 to 17C, an exemplary bearing support assembly 700 is shown. The bearing support assembly 700 includes a plurality of ribs 704. The ribs 704 are coupled to a frame 702, also referred to as a bearing support frame 702. The ribs 704 are spaced circumferentially around the bearing support assembly 700. The ribs 704 are located between a frame 702 and a bearing support 706. The ribs 704 may include fixed ribs 705 and movable ribs 707. The fixed ribs 705 may be provided in an alternating pattern with the movable ribs 707. The movable ribs 707 are rotatable with respect to the frame 702. For example, when viewing the bearing support assembly 700 in an end view, the movable ribs 707 may have a vertical position 708 or a horizontal position 710. The orientation of the movable ribs 707 may be selected to provide a desired stiffness around the circumference of the bearing support assembly 700.

Figure 14:
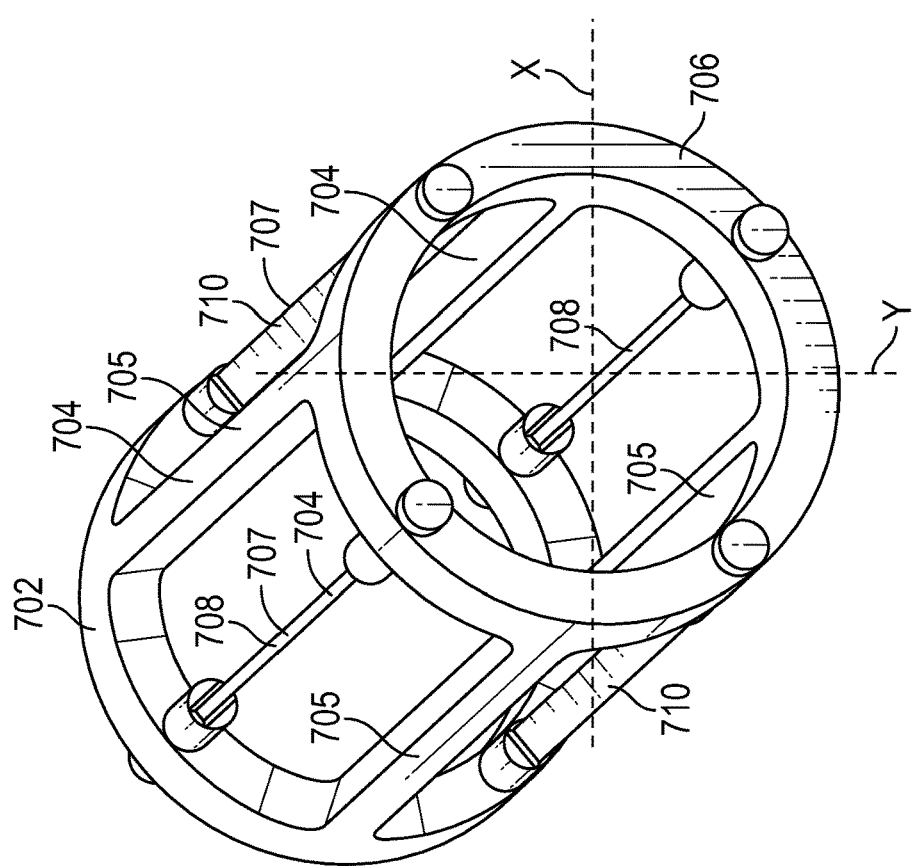
FIG. 14 shows a schematic, perspective view of a bearing support, according to an embodiment of the present disclosure.
Figure 13:
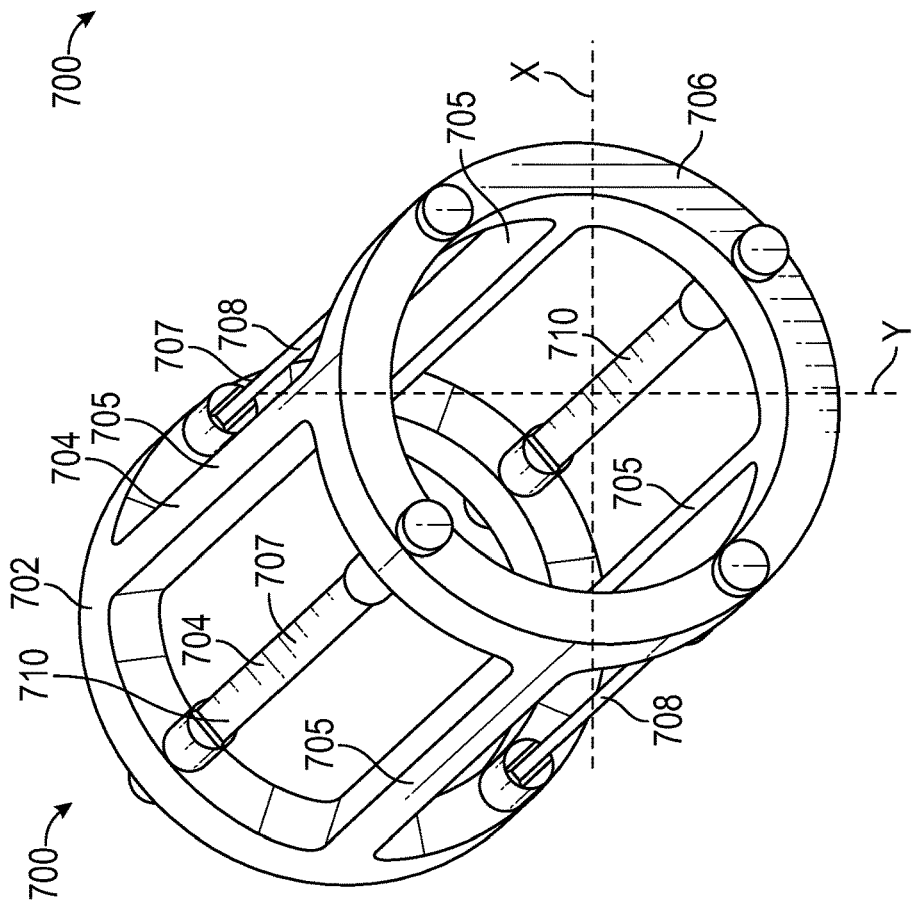
FIG. 13 shows a schematic, perspective view of a bearing support, according to an embodiment of the present disclosure.
Figure 16:
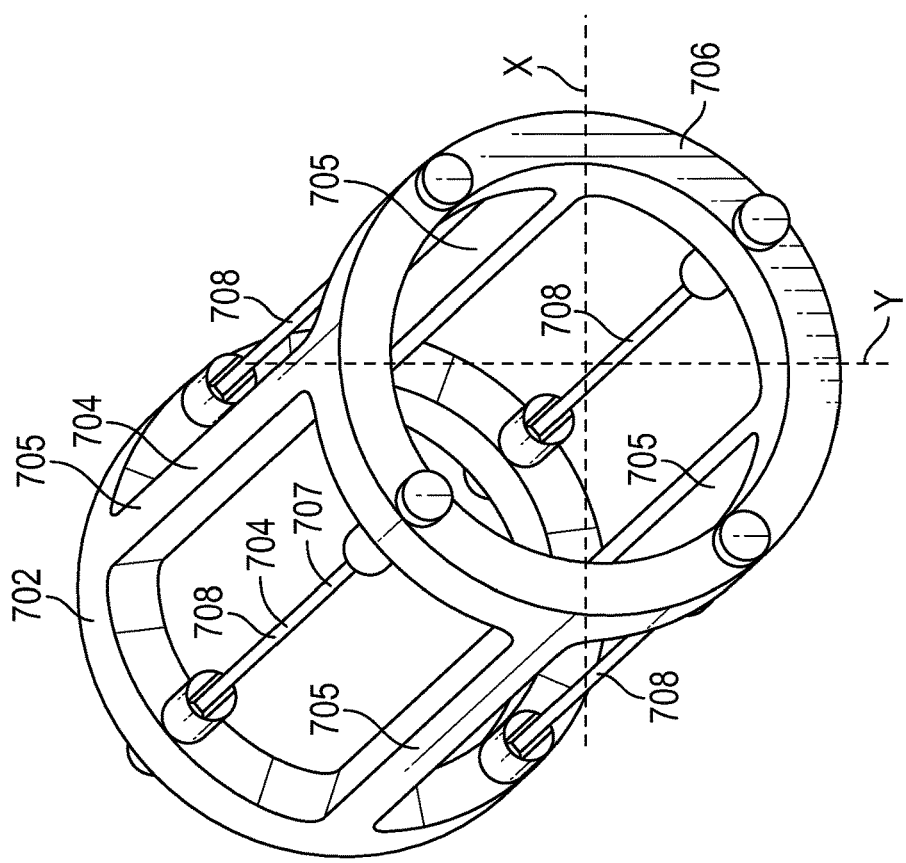
FIG. 16 shows a schematic, perspective view of a bearing support, according to an embodiment of the present disclosure.
Figure 15:
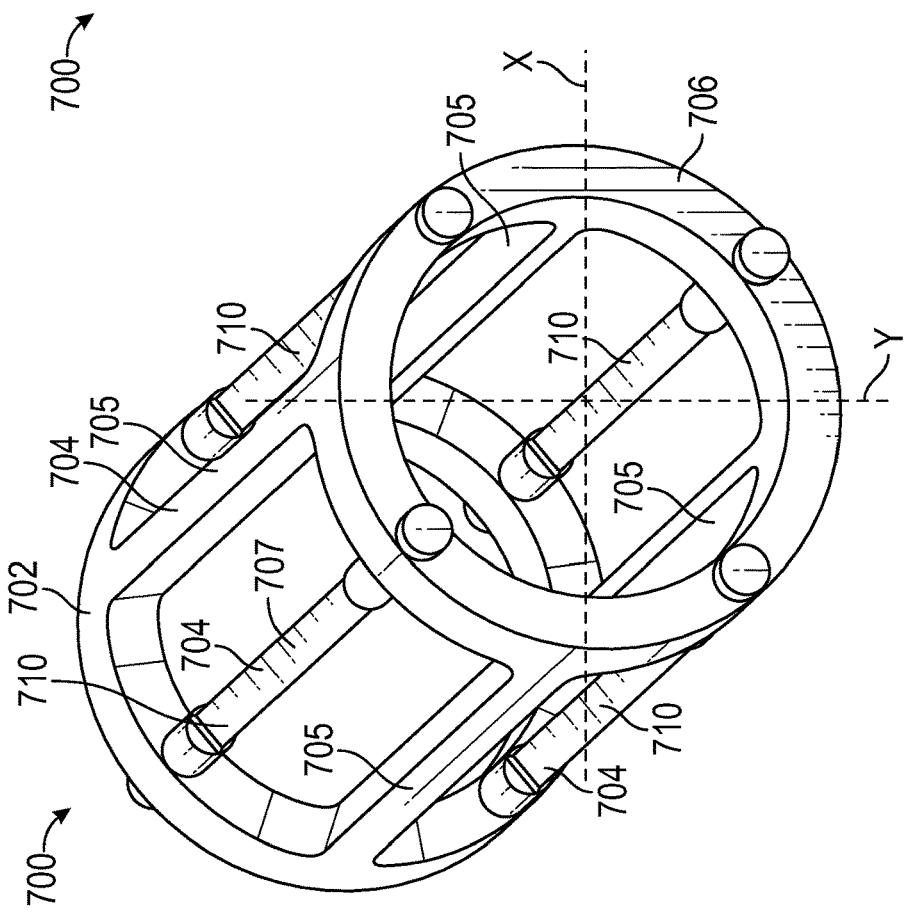
FIG. 15 shows a schematic, perspective view of a bearing support, according to an embodiment of the present disclosure.

For example, in FIG. 13, a movable rib 707 at the twelve o'clock position and at the six o'clock position may be in the horizontal position 710. A movable rib 707 at the three o'clock position and the nine o'clock position may be in the vertical position 708. This may result in a higher stiffness at the horizontal position 710 than at the vertical position 708, Thus, a higher stiffness at the three o'clock position and the nine o'clock position than at the twelve o'clock position and the six o'clock position. In FIG. 14, the arrangement of the bearing support assembly 700 may be reversed such that the movable ribs 707 at the twelve o'clock position and at the six o'clock position are in the vertical position 708. The movable ribs 707 at the three o'clock position and the nine o'clock position are in the horizontal position 710. This may result in a higher stiffness at the twelve o'clock position and the six o'clock position than at the three o'clock position and the nine o'clock position. In FIG. 15, each of the twelve o'clock position, the three o'clock position, the six o'clock position, and the nine o'clock position may be located in the horizontal position 710. In FIG. 16, each of the twelve o'clock position, the three o'clock position, the six o'clock position, and the nine o'clock position may be located in the vertical position 708.

Figure 17A:
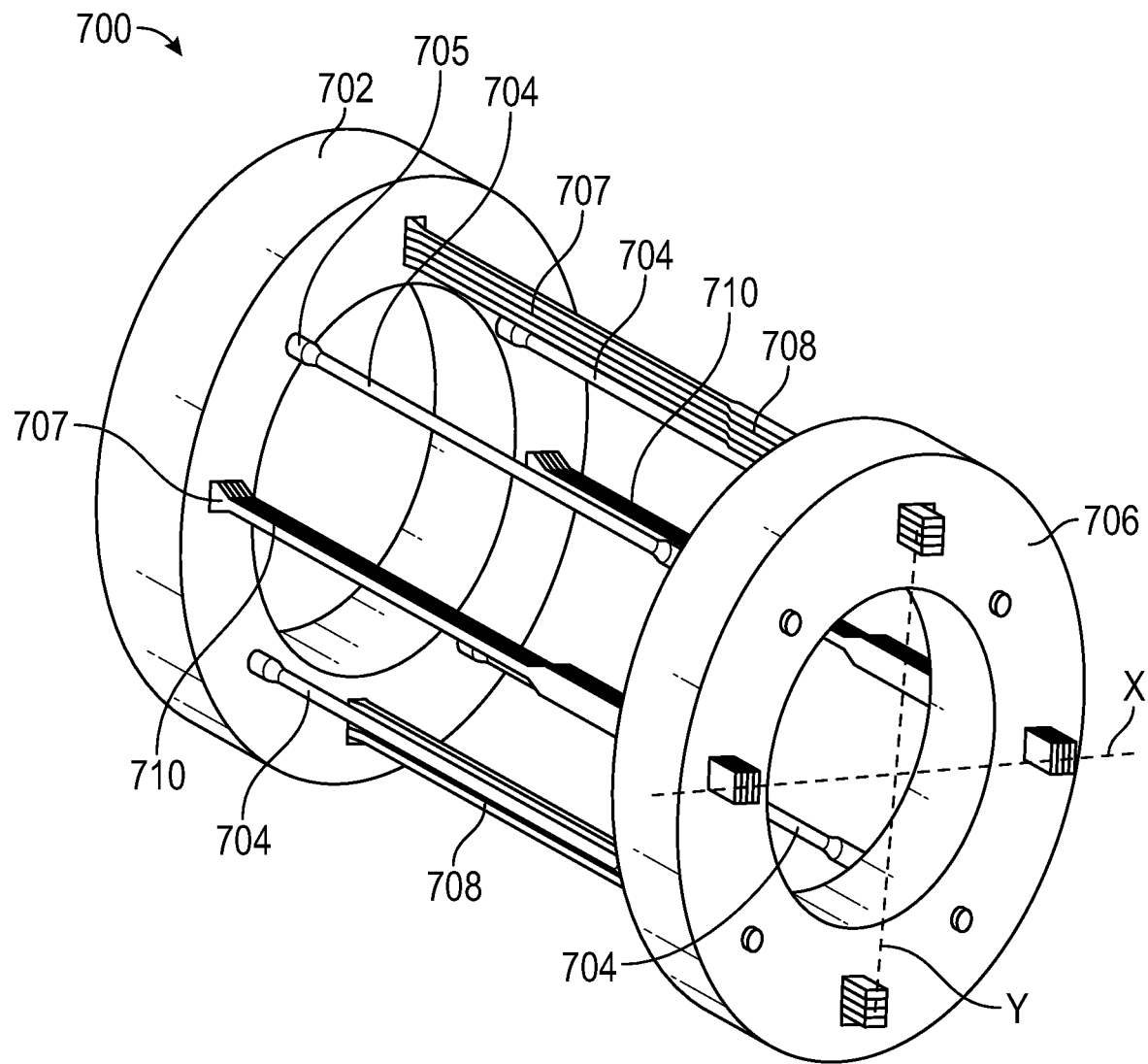
FIG. 17A shows a schematic, perspective view of a bearing support, according to an embodiment of the present disclosure.
Figure 17B:
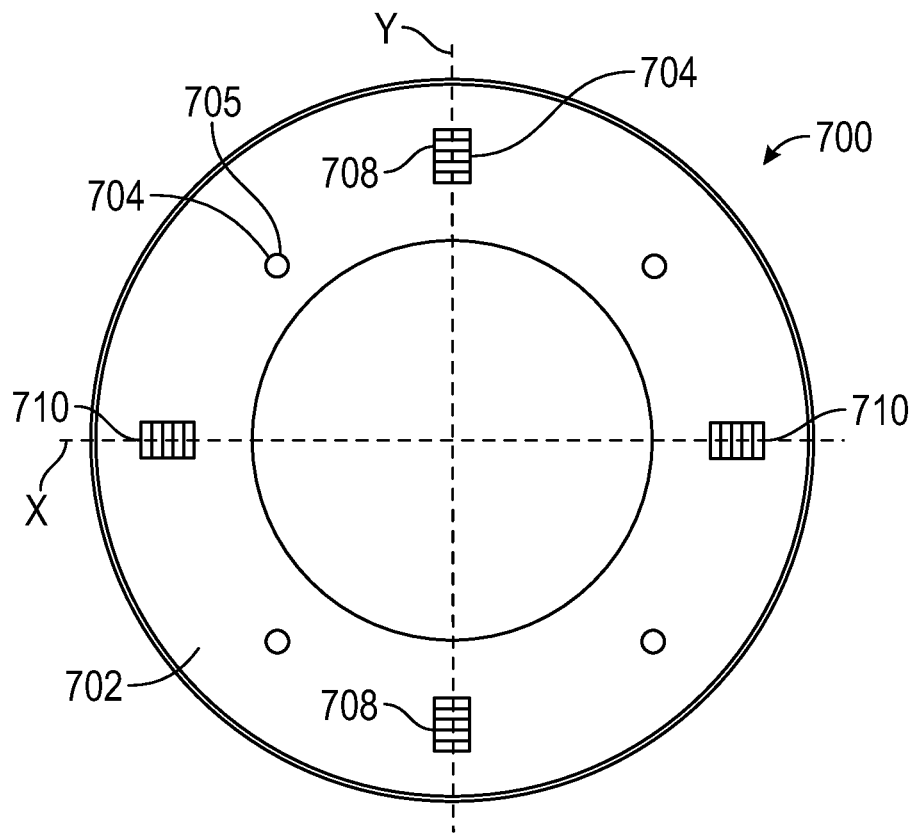
FIG. 17B shows a schematic end view of the bearing support of FIG. 17A, according to an embodiment of the present disclosure.
Figure 17C:
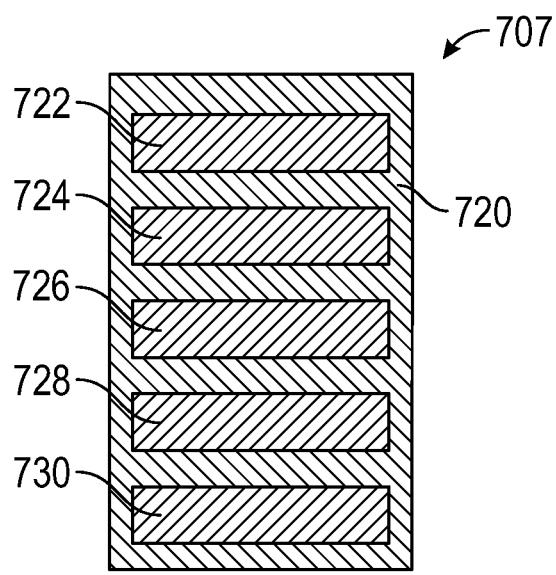
FIG. 17C shows a schematic, cross-sectional view of a rib of the bearing support of FIG. 17A, taken along a plane extending in the radial direction of FIG. 17A, according to an embodiment of the present disclosure.

In FIGS. 17A to 17C, the arrangement of the movable ribs 707 may be the same as that shown in FIG. 14, with the movable ribs 707 at the twelve o'clock position and at the six o'clock position are in the vertical position 708. The movable ribs 707 at the three o'clock position and the nine o'clock position are in the horizontal position 710. The fixed ribs 705 may have a cross-section that is rectangular, circular, polygonal, or other shapes. For example, the fixed ribs 705 may be rods or strips. As shown in FIG. 17C, each of the movable ribs 707 may be formed of stacked materials. For example, the movable rib 707 of FIG. 17C may have a first material layer 722, a second material layer 724, a third material layer 726, a fourth material layer 728, and a fifth material layer 730. Although five layers are described, more or fewer may be provided. The layers may be located within a base material 720. Stacking the layers close in a tight stack (e.g., when the gap between the layers is small) results in a higher stiffness than stacking the layers loosely (e.g., when the gap between the layers is larger than the tight stack). Therefore, the number of layers, the material of the layers, the material of the base material 720, the gap between the layers, or any combination thereof may be altered to achieve a desired stiffness. The movable ribs 707 may have a varying stiffness with respect to the load applied to the bearing support assembly 700 and the fixed ribs 705 may have a constant stiffness.

FIGS. 18 to 25 describe non-axisymmetric bearing support assemblies. The bearing support assemblies of FIGS. 18 to 25 may have a bearing support assembly that has a circumferential stiffness variation that is activated after a threshold design level.

Figure 18:
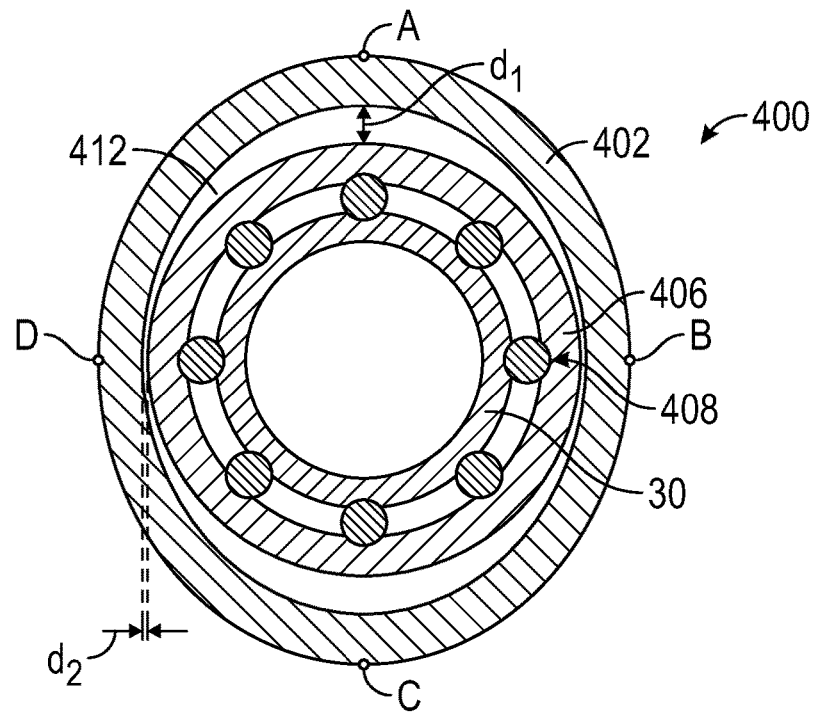
FIG. 18 shows a schematic, front end cross-sectional view of a bearing support assembly with bearings and a shaft, according to an embodiment of the present disclosure.
Figure 19:
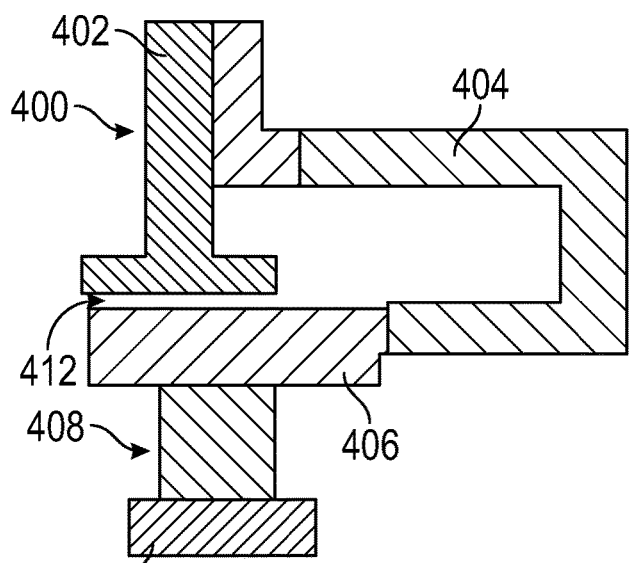
FIG. 19 shows a schematic side, cross-sectional view of a bearing support assembly, taken along a centerline of an engine, according to an embodiment of the present disclosure.
Figure 20:
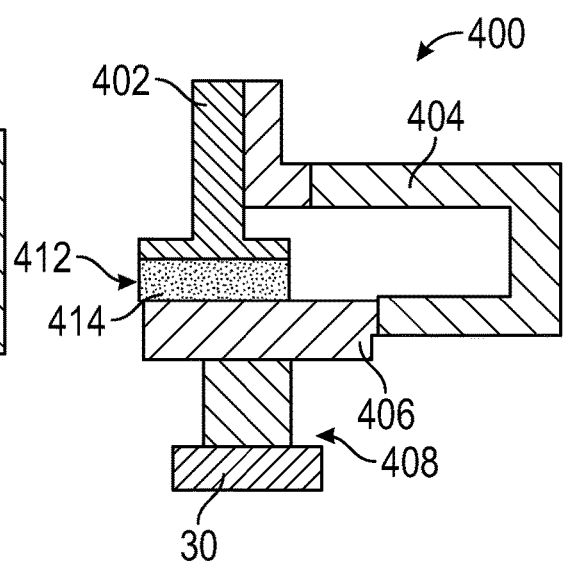
FIG. 20 shows a schematic side, cross-sectional view of a bearing support assembly, taken along a centerline of an engine, according to an embodiment of the present disclosure.

FIGS. 18 to 20 show an exemplary bearing support assembly 400. The bearing support assembly 400 includes a plurality of ribs 404 spaced circumferentially around the bearing support assembly 400. The plurality of ribs 404 may be located between a frame 402, also referred to as a bearing support frame 402, and a bearing support 406. Points A, B, C, and D, again represent, respectively, the twelve o'clock position, the three o'clock position, the six o'clock position, and the nine o'clock position around the circumference of the bearing support assembly 400. The bearing support assembly 400 may support a plurality of bearings 408 located around the shaft 30.

As described previously, a stiffness may be varied around the circumference of the bearing support assembly 400. In the example of FIGS. 18 to 20, the stiffness may be varied by providing a clearance or gap 412 between the frame 402 and the bearing support 406. The gap 412 may be non-uniform around the circumference of the bearing support assembly 400. The gap 412 may be varied in size around the circumference of the bearing support assembly 400. In some examples, the gap 412 may be filled with a material 414 that may vary the stiffness around the circumference of the bearing support assembly 400.

Referring to FIG. 18, the gap 412 has a first radial distance $d_1$ and a second radial distance $d_2$ between an outer surface of the bearing support 406 and an inner surface of the frame 402. The first radial distance $d_1$ may be greater than the second radial distance $d_2$. The radial distance increases circumferentially from the second radial distance $d_2$ to the first radial distance $d_1$. The first radial distance $d_1$ may be present at point A and point C. The second radial distance $d_2$ may be present at point B and point D. In this manner, the gap 412 may decrease from point A to point B, increase from point B to point C, decrease from point C to point D, and increase from point D to point A. This may allow for a varying stiffness of the bearing support assembly 400 in the circumferential direction.

The bearing support 406 and the frame 402 of FIGS. 18 to 20 are uniform in cross-section and uniform or symmetric in stiffness. The gap 412 is asymmetric. The larger gap (e.g., distance $d_1$) at point A and point C may allow for a softer plane or lower stiffness than the smaller gap (e.g., distance $d_2$) at point B and point D, which may be a larger stiffness as compared to point A and point C.

In the example of FIG. 20, a material 414 may optionally be placed within the gap 412. The material 414 may be a soft material that is sandwiched between the bearing support 406 and the frame 402. The material 414 may be varied around the circumference of the bearing support assembly 400 either by varying the thickness or varying the material. The material 414 may be, but is not limited to, a viscoelastic material, a rubber material, a shape memory alloy material, or combinations thereof.

Figure 21:
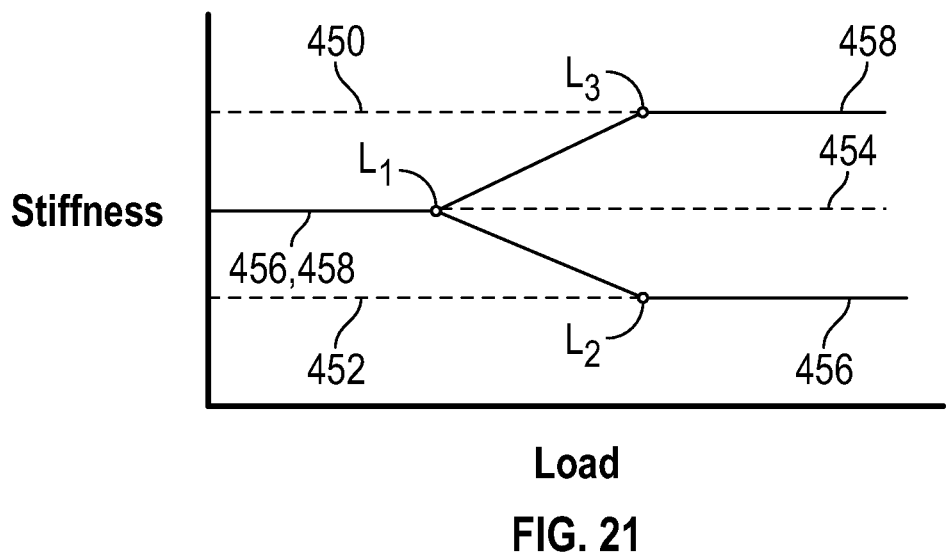
FIG. 21 shows a graph of the stiffness of a bearing support assembly as a function of load applied to the bearing support assembly, according to an embodiment of the present disclosure.

FIG. 21 illustrates the stiffness of the bearing support assembly 400 (FIG. 18) as a function of the load applied to the bearing support assembly 400. As mentioned, the stiffness of the bearing support assembly 400 is load dependent and varies along the circumference. For example, since the distance $d_2$ is smaller at point B and point D, when a load is applied at these points, the bearing support 406 will come in contact with the frame sooner than when the same load is applied at point A and at point C. This is shown in FIG. 21 via an X-axis curve 458 and a Y-axis curve 456. The X-axis curve 458 represents the stiffness of the bearing support assembly 400 at point B and point D (FIG. 18). The Y-axis curve 456 represents the stiffness of the bearing support assembly 400 at point A and point C (FIG. 18). A line 454 represents a mean stiffness of the bearing support assembly, a line 450 represents a stiffness above the mean stiffness and a line 452 represents a stiffness below the mean stiffness. In FIG. 21, as a load is applied to the bearing support assembly, all points around the bearing support assembly will exhibit the same stiffness. This is because, referring to FIG. 18, neither of the distances $d_1$ or $d_2$ have been closed to close the gap 412. At point $L_1$, (e.g., a threshold load level) the load continues to increase and the gap 412 continues to shrink. At point $L_3$, the gap 412 at point B and point D in FIG. 3, the gap 412 is closed and the bearing support 406 and the frame 402 are touching. This results in a high stiffness, i.e., a stiffness above the mean stiffness. At point $L_2$, the gap 412 at point B and point D is closed, but the gap 412 at point A and point C is still present. This results in a low stiffness, i.e., a stiffness below the mean stiffness.

Figure 22:
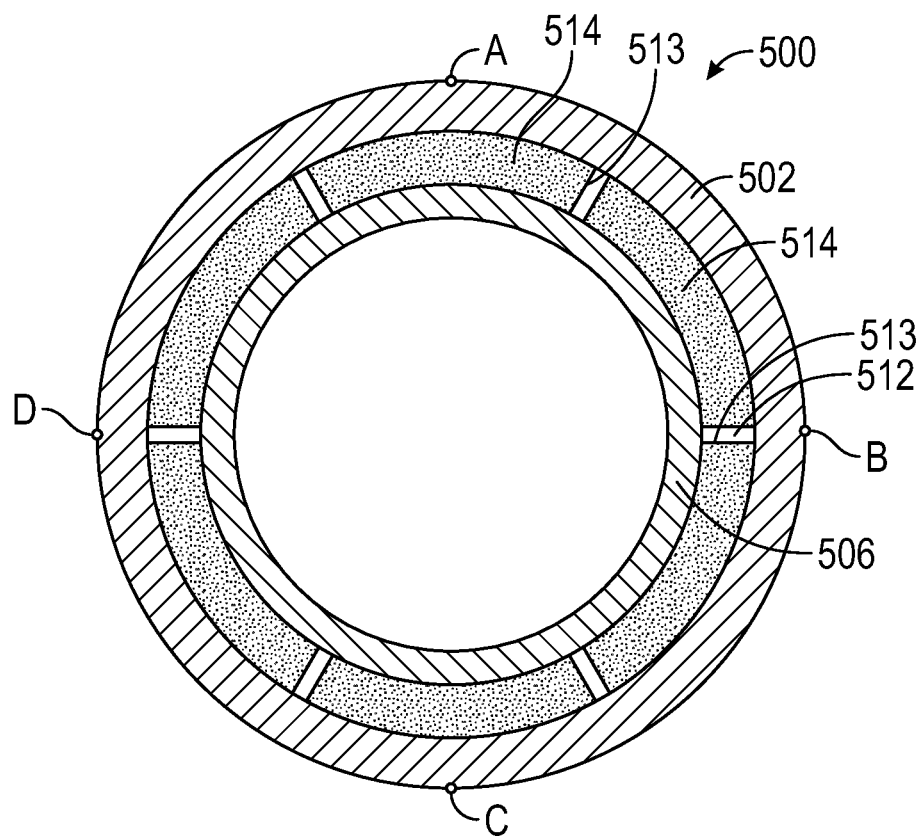
FIG. 22 shows a schematic, front end cross-sectional view of a bearing support assembly with bearings and a shaft, according to an embodiment of the present disclosure.
Figure 23:
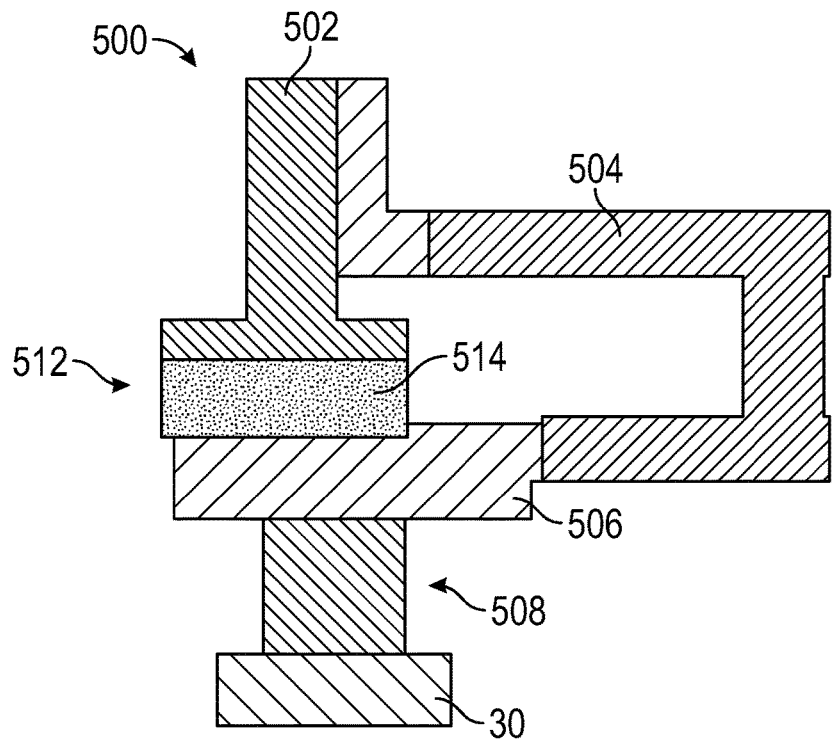
FIG. 23 shows a schematic side, cross-sectional view of a bearing support assembly, taken along a centerline of an engine, according to an embodiment of the present disclosure.
Figure 24:
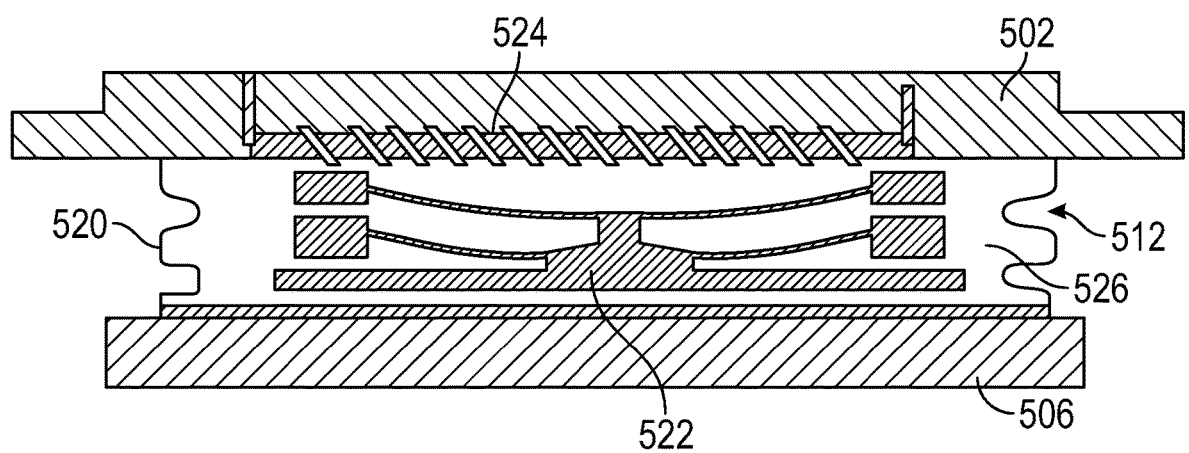
FIG. 24 shows a schematic side, cross-sectional view of a bearing support assembly, taken along a centerline of an engine, according to an embodiment of the present disclosure.

FIGS. 22 to 24 show an exemplary bearing support assembly 500. The bearing support assembly 500 includes a plurality of ribs 504 spaced circumferentially around the bearing support assembly 500. The plurality of ribs 504 may be located between a frame 502, also referred to as a bearing support frame 502, and a bearing support 506. Points A, B, C, and D, again represent, respectively, the twelve o'clock position, the three o'clock position, the six o'clock position, and the nine o'clock position around the circumference of the bearing support assembly 500. The bearing support assembly 500 may support a plurality of bearings 508 located around the shaft 30.

As described previously, a stiffness may be varied around the circumference of the bearing support assembly 500. In the example of FIGS. 22 and 23, the stiffness may be varied by providing a clearance or gap 512 between the frame 502 and the bearing support 506. The gap 512 may be uniform around the circumference of the bearing support assembly 500. The gap 512 may be filled with a first material 514 and a second material 513 that may vary the stiffness around the circumference of the bearing support assembly 500. The first material 514 and the second material 513 may have a changing stiffness that varies 360° circumferentially. For example, the first material 514 and/or the second material 513 may be a shape memory alloy. The material, e.g., the shape memory alloy, may have a varying stiffness.

The bearing support assembly 500 may be a symmetric bearing support with a non-symmetric system stiffness. As shown in FIG. 22, the non-symmetric stiffness may be achieved by providing a first material 514 having a first stiffness and a second material 513 having a second stiffness. In some examples, the first stiffness may be greater than the second stiffness. In some examples, the first stiffness may be lesser than the second stiffness. For example, in FIG. 18, the first stiffness may be lesser than the second stiffness, such that stiffness at point A and point C is lower than the stiffness at point B and point D, as is described with respect to FIG. 20.

FIG. 24 shows another manner to vary the stiffness of the material located in the gap 512 between the frame 502 and the bearing support 506 around the circumference of the bearing support assembly 500 (FIG. 22). In FIG. 24, the gap 512 may have a bellows 520 located therein. Within the bellows 520 may be located a spring 522, a magnetorheological (MR) fluid 526, and a coil 524. The MR fluid 526 may be a non-newtonian fluid. FIG. 24 may be a fluid damper with varying stiffness in the circumferential direction. As a load is applied to the bellows 520 to compress the spring 522, the MR fluid 526 is also compressed. As the load increases and the MR fluid 526 is increasingly being compressed, in a first direction (e.g., at point B and point D), the stiffness may increase with respect to a second direction (e.g., at point A and point C).

Figure 25:
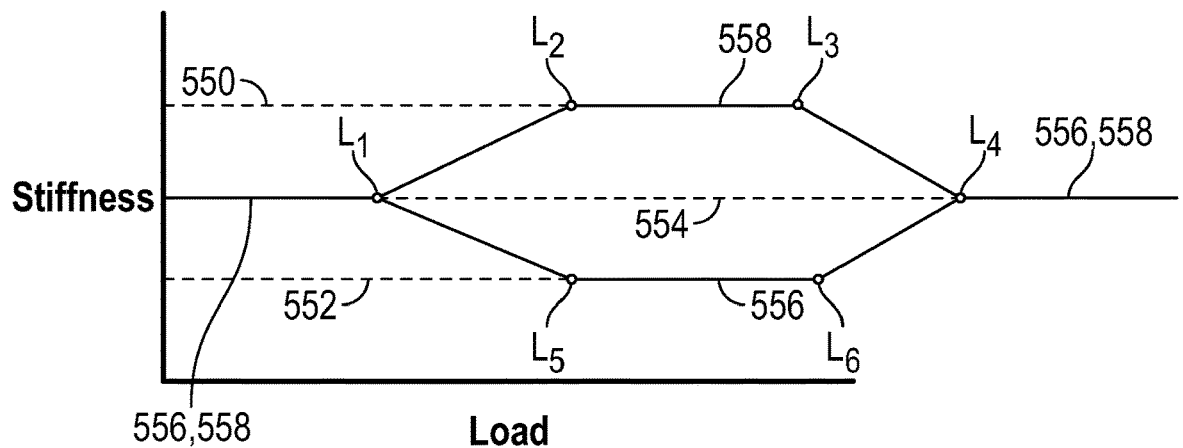
FIG. 25 shows a graph of the stiffness of a bearing support assembly as a function of load applied to the bearing support assembly, according to an embodiment of the present disclosure.

FIG. 25 illustrates the stiffness of the bearing support assembly 500 (FIG. 22) as a function of the load applied to the bearing support assembly 500. The graph will appear the same for either varying the material stiffness as in the arrangement in FIG. 23 or as in the arrangement in FIG. 24. As mentioned, the stiffness of the bearing support assembly 500 is load dependent and varies along the circumference. For example, since the material stiffness changes in the circumferential direction, when a load is applied, the bearing support 406 will come in contact with the frame sooner at points where the material stiffness is less (e.g., at point B and point D) than when the same load is applied where the material stiffness is greater (e.g., at point A and at point C). This is shown in FIG. 25 via an X-axis curve 558 and a Y-axis curve 556. The X-axis curve 558 represents the stiffness of the bearing support assembly 500 at point B and point D (FIG. 22). The Y-axis curve 556 represents the stiffness of the bearing support assembly 500 at point A and point C (FIG. 22). A line 554 represents a mean stiffness of the bearing support assembly, a line 550 represents a stiffness above the mean stiffness, and a line 552 represents a stiffness below the mean stiffness.

In FIG. 25, as a load is applied to the bearing support assembly, all points around the bearing support assembly will exhibit the same stiffness. This is because the material at all points accommodates the load. At point $L_1$, the load continues to increase and the softer material at point B and point D begins to compress, resulting in increased stiffness as shown in curve 558. As the softer material compresses, the point B and point D take on more of the load and the stiffness at point A and point C begins to decrease. At point $L_2$, the material at point B and point D is fully compressed and a maximum stiffness is experienced until point $L_3$ when the load applied has compressed the material at points A and point C such that the stiffness at all points equals out again at point $L_4$. On the other hand, at point $L_5$, due to compression of the material at points B and point D, the load experienced by point A and point C is lowered until point $L_6$ where the stiff is equalized as described previously.

Figure 26:
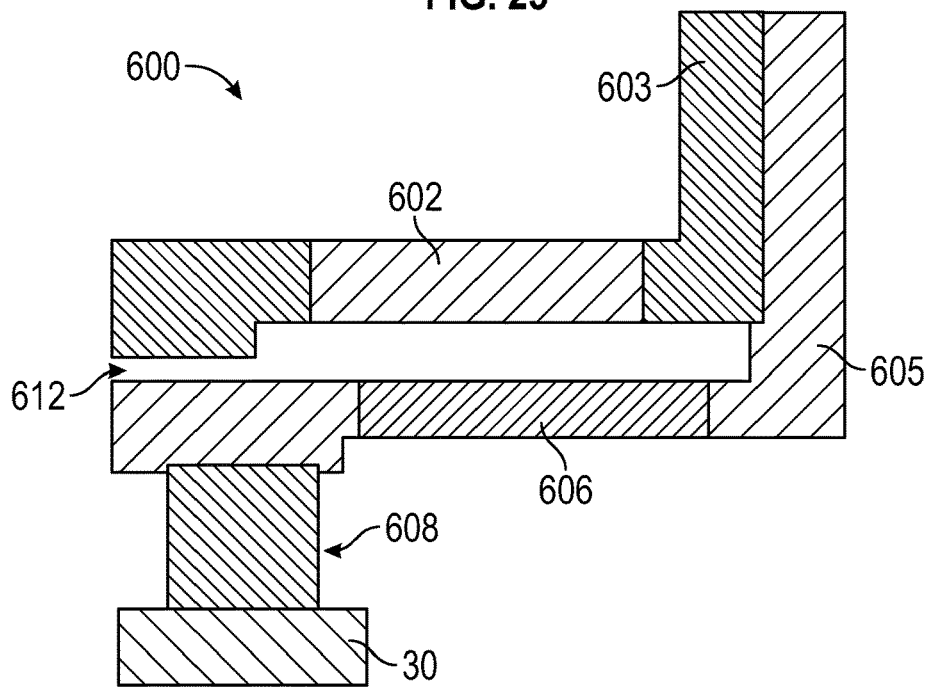
FIG. 26 shows a schematic side, cross-sectional view of a bearing support assembly, taken along a centerline of an engine, according to an embodiment of the present disclosure.
Figure 27:
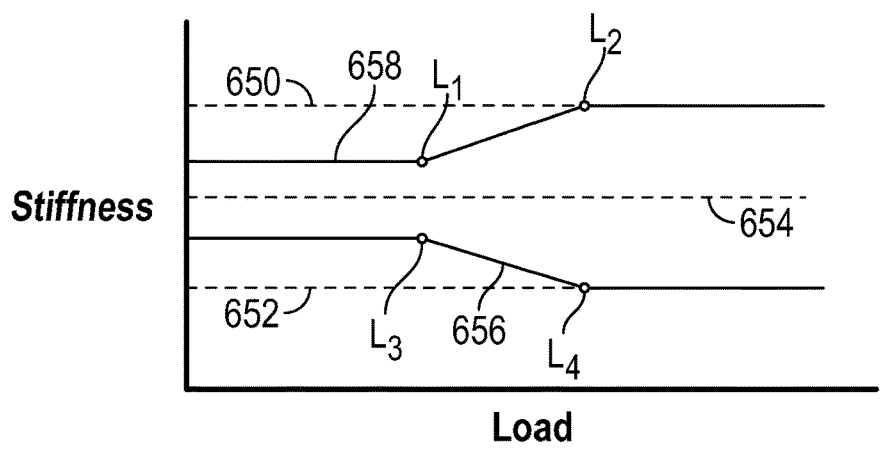
FIG. 27 shows a graph of the stiffness of a bearing support assembly as a function of load applied to the bearing support assembly, according to an embodiment of the present disclosure.

FIGS. 26 and 27 describe a bi-linear circumferential stiffness variation that is activated after a threshold level. A bearing assembly 600 of FIG. 26 has a bearing support 606 and a frame 602, also referred to as a bearing support frame 602. The frame 602 has a spring finger 603. The bearing support 606 has a spring finger 605. A gap 612 between the bearing support 606 and the frame 602 may be uniform. One or more bearings 608 may be supported between the shaft 30 and the bearing support 606. Each of the bearing support 606 and the frame 602 may have asymmetric stiffness.

FIG. 27 shows an X-axis curve 658 and a Y-axis curve 656. The X-axis curve 658 represents the stiffness of the bearing support assembly 600 at point B and point D (e.g., FIG. 22). The Y-axis curve 656 represents the stiffness of the bearing support assembly 600 at point A and point C (e.g., FIG. 22). A line 654 represents a mean stiffness of the bearing support assembly, a line 650 represents a stiffness above the mean stiffness and a line 652 represents a stiffness below the mean stiffness.

In FIG. 27, it can be seen that the X-axis location of the bearing support assembly 600 will always have a greater stiffness than the Y-axis location of the bearing support assembly 600. At the X-axis, as a load is applied to the bearing support assembly 600, the bearing support assembly 600 exhibits a first stiffness. When the gap 612 closes, at load $L_1$, the stiffness at the X-axis location increases to the line 650 at load $L_2$, which may be the maximum stiffness. At the Y-axis, as a load is applied to the bearing support assembly, the bearing support assembly 600 exhibits a first stiffness. When the gap 612 closes, at load $L_3$, the stiffness at the Y-axis location decreases to the line 652 at load $L_4$, which may be the minimum stiffness, due to the closing of the gap 612 at the Y-axis location.

Figure 28:
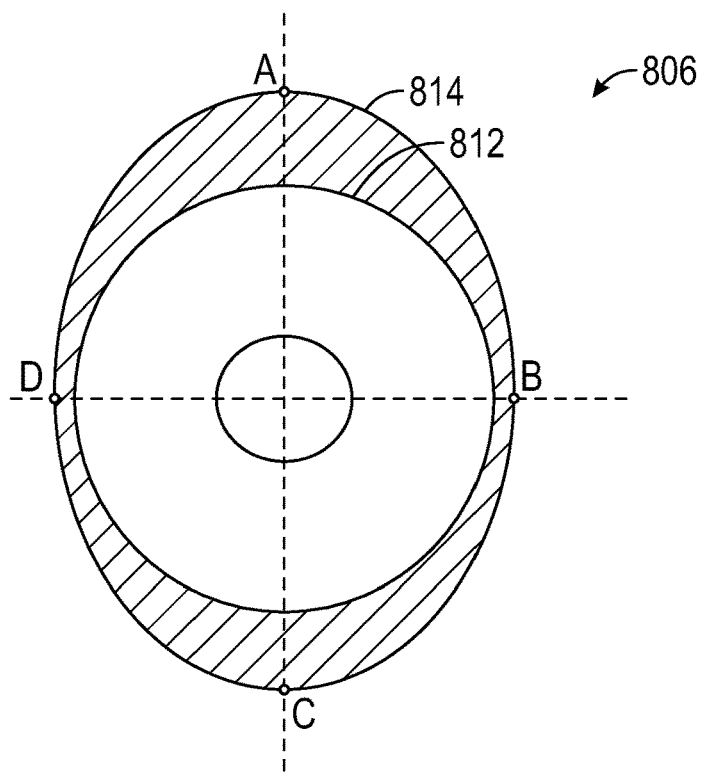
FIG. 28 shows a schematic cross-sectional view describing the stiffness of a bearing support assembly, according to an embodiment of the present disclosure.

FIGS. 28 to 32 show examples of non-axisymmetric supports. The examples of FIGS. 28 to 32 may have cross sections of varying thickness. For example, in FIG. 28, a bearing support 806 have a cross section is varying in thickness. The bearing support 806 of FIG. 28 is always non-symmetric. The bearing support 806 may have an inner diameter 812 and an outer diameter 814. At the inner diameter 812, the cross section may be circular. At the outer diameter 814, the cross section may be ovular or elliptical. Points A, B, C, and D, again represent, respectively, the twelve o'clock position, the three o'clock position, the six o'clock position, and the nine o'clock position around the circumference of the bearing support 806. At the position of A and C, the cross section has a maximum thickness and at the position of B and D, the cross section has a minimum thickness. From point A to point B, the thickness of the cross section gradually decreases to point B, then increases to point C, decreases to point D, and, finally, increases to point A. This allows for varying the stiffness around the bearing support 806. As mentioned previously, the variation may be any of the variations described with respect to FIGS. 4A to 4D.

Figure 29:
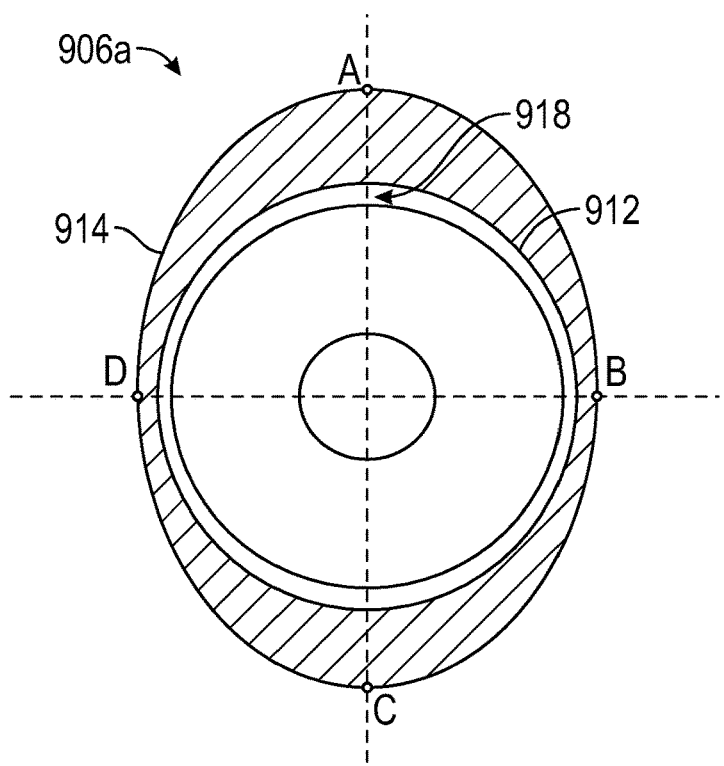
FIG. 29 shows a schematic cross-sectional view describing the stiffness of a bearing support assembly, according to an embodiment of the present disclosure.

In FIG. 29, a bearing support 906a may have an inner diameter 912 and an outer diameter 914. At the inner diameter 912, the cross section may be circular. At the outer diameter 914, the cross section may be ovular or elliptical. The bearing support 906a of FIG. 29 is non-symmetric only during high loads and is symmetric in nominal loads. This is due to a gap 918. At high loads, the gap 918 at point B and point D will be closed resulting in a higher stiffness than at point A and point C where the gap 918 is still open. Below the load at which the gap 918 is closed at point B and point D, however, the stiffness will be symmetric since all points will exhibit the same stiffness.

Figure 30:
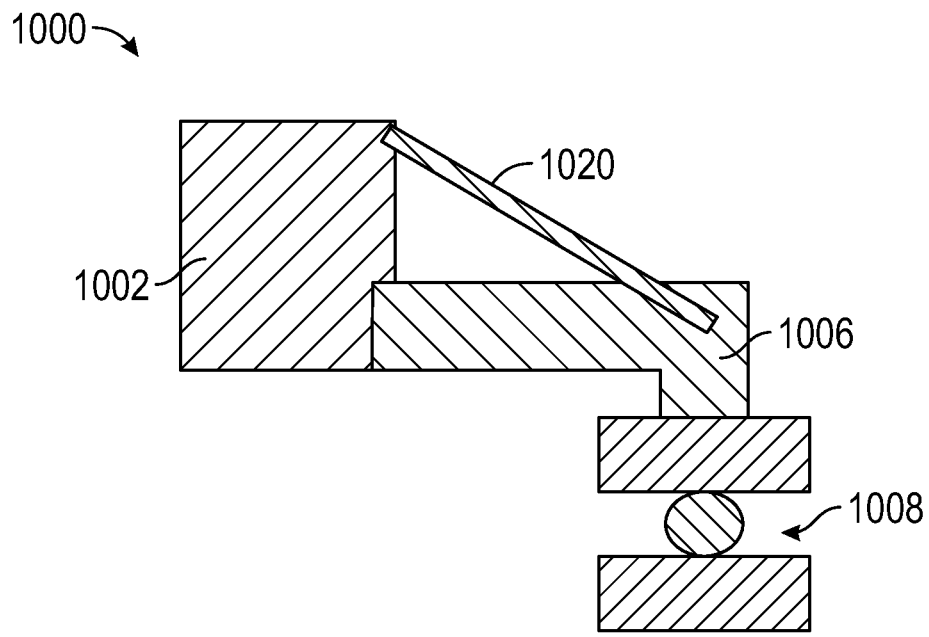
FIG. 30 shows a schematic side, cross-sectional view of a bearing support assembly, taken along a centerline of an engine, according to an embodiment of the present disclosure.
Figure 31:
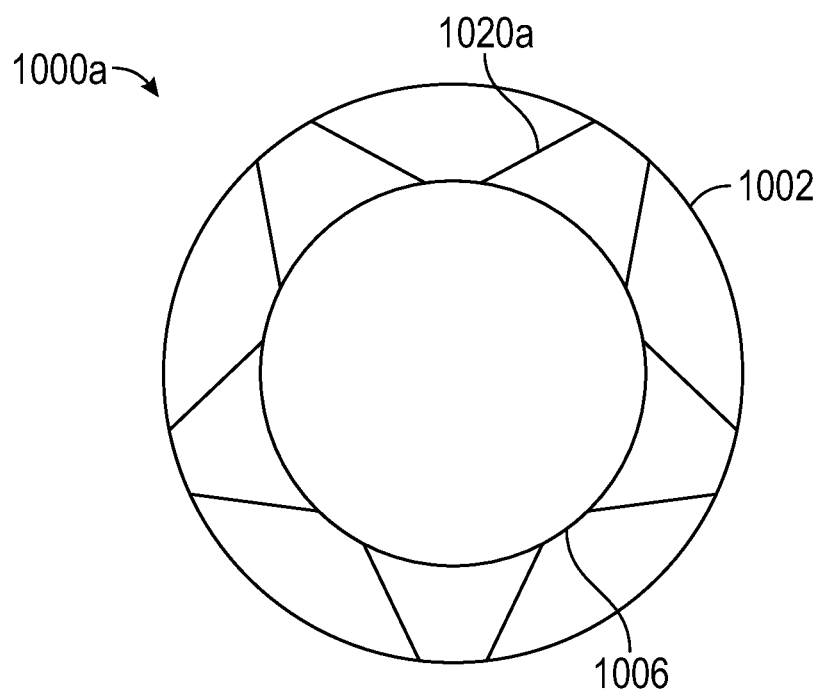
FIG. 31 shows a schematic end view of a bearing support assembly, according to an embodiment of the present disclosure.
Figure 32:
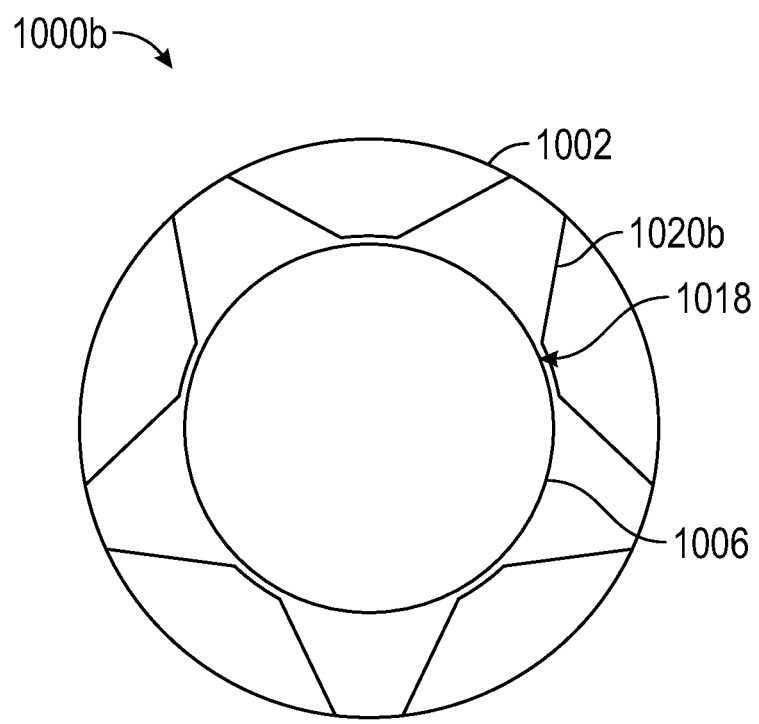
FIG. 32 shows a schematic end view of a bearing support assembly, according to an embodiment of the present disclosure.

FIGS. 30 to 32 show a bearing support assembly 1000. In FIG. 31, a bearing support assembly 1000a may always be non-symmetric and, in FIG. 32, a bearing support assembly 1000b may be non-symmetric only during high loads and may be symmetric at nominal loads. Referring to FIG. 30, the bearing support assembly 1000 (which may also be the bearing support assembly 1000a and the bearing support assembly 1000b) has a frame 1002, also referred to as a bearing support frame 1002, a bearing support 1006, and bearings 1008. The bearing support assembly 1000 also includes a bearing supplemental support 1020. The bearing supplemental support 1020 may be placed non-axisymmetrically to vary the stiffness around the circumference of the bearing support assembly 1000. For example, in FIG. 31, a bearing supplemental support 1020a may be placed radially inward and outward between the frame 1002 and the bearing support 1006. When the members of the bearing supplemental support 1020a are present (e.g., in the trapezoidal area), the stiffness may be higher than at locations with no members. In FIG. 32, a bearing supplemental support 1020b may be placed such that a gap 1018 exists between the bearing supplemental support 1020b and the bearing support 1006. In this manner, the non-symmetric stiffness occurs only when the load has increased past a point at which the gap 1018 is closed, activating the members of the bearing supplemental support 1020b in a manner similar to that shown in FIG. 31.

Accordingly, the bearing support assemblies of the present disclosure allow for varying the stiffness of the bearing support assembly. This results in a desired directional stiffness of the bearing support assembly. This further results in a desired active support of the bearings on the shaft at various locations around the circumference of the bearing support assembly based on the particular stiffness at that location.

The stiffness referred to herein is the stiffness K of a body that is measured in Newtons per meter or pounds per inch. That is, the stiffness is the engineering stiffness that represents the resistance of an elastic body to deflection or deformation by an applied force.

The terms "coupled," "fixed," "attached to," "connected," and the like, refer to both direct coupling, fixing, attaching, or connecting, as well as indirect coupling, fixing, attaching, or connecting, through one or more intermediate components or features, unless otherwise specified herein.

Further aspects of the present disclosure are provided by the subject matter of the following clauses.

A bearing support assembly configured to support one or more bearings on a shaft including a bearing support frame configured to be coupled to a static frame, a plurality of ribs connected to the bearing support frame, and a bearing support connected to the plurality of ribs and configured to support a bearing, wherein the bearing support assembly has a non-axisymmetric stiffness varying around a circumference of the bearing support assembly.

The bearing support assembly of any preceding clause, wherein the bearing support assembly always has a non-axisymmetric stiffness around the circumference of the bearing support assembly.

The bearing support assembly of any preceding clause, wherein the bearing support assembly has a non-axisymmetric stiffness above a threshold load level and a symmetric stiffness below the threshold load level.

The bearing support assembly of any preceding clause, wherein the non-axisymmetric stiffness is a sinusoidal curve, a linear curve, a spline, or combinations thereof.

The bearing support assembly of any preceding clause, wherein the bearing support frame has a twelve o'clock position, a three o'clock position, a six o'clock position, and a nine o'clock position, and wherein a stiffness of the bearing support frame is greater at the twelve o'clock position and the six o'clock position than at the three o'clock position and the nine o'clock position.

The bearing support assembly of any preceding clause, wherein the bearing support frame has a twelve o'clock position, a three o'clock position, a six o'clock position, and a nine o'clock position, and wherein a stiffness of the bearing support frame is lower at the twelve o'clock position and the six o'clock position than at the three o'clock position and the nine o'clock position.

The bearing support assembly of any preceding clause, wherein the bearing support frame has a stiffness at an X-axis that is greater than a stiffness at a Y-axis.

The bearing support assembly of any preceding clause, wherein the bearing support frame has a stiffness at an X-axis that is lower than a stiffness at a Y-axis.

The bearing support assembly of any preceding clause, the non-axisymmetric stiffness is achieved by altering a material of one or more of the plurality of ribs.

The bearing support assembly of any preceding clause, wherein the plurality of ribs comprises a first subset of ribs and a second subset of ribs, and wherein a material of the first subset of ribs is different than a material of the second subset of ribs.

The bearing support assembly of any preceding clause, wherein the material of the first subset of ribs is a steel base with an aluminum deposit outer layer and the material of the second subset of ribs is a steel base with a titanium deposit outer layer.

The bearing support assembly of any preceding clause, wherein the plurality of ribs comprises a hybrid rib arrangement.

The bearing support assembly of any preceding clause, wherein the hybrid rib arrangement comprises a combination of solid ribs, hollow ribs, hollow-filled ribs, or any combination thereof.

The bearing support assembly of any preceding clause, wherein the non-axisymmetric stiffness is achieved by altering the bearing support.

The bearing support assembly of any preceding clause, wherein the bearing support comprises a first bearing support separated by a gap from a second bearing support.

The bearing support assembly of any preceding clause, wherein the gap includes a first gap and a second gap, the first gap between a first distal end of the first bearing support and a first distal end of the second bearing support and the second gap between a second distal end of the first bearing support and a second distal end of the second bearing support.

The bearing support assembly of any preceding clause, wherein the bearing support is a split bearing support.

The bearing support assembly of any preceding clause, further comprising a nonsymmetric gap between the bearing support and the bearing support frame.

The bearing support assembly of any preceding clause, further comprising a material in the nonsymmetric gap.

The bearing support assembly of any preceding clause, wherein the material is a viscoelastic material, a rubber material, a shape memory alloy, or combinations thereof.

The bearing support assembly of any preceding clause, wherein a first stiffness at an X-axis location is greater than a second stiffness at a Y-axis location above a threshold load level, and the first stiffness is the same as the second stiffness below the threshold load level.

The bearing support assembly of any preceding clause, further comprising a symmetric gap between the bearing support and the bearing support frame.

The bearing support assembly of any preceding clause, wherein the symmetric gap is filled with a first material and a second material, the first material having a greater stiffness than that of the second material.

The bearing support assembly of any preceding clause, further comprising a symmetric gap between the bearing support and the bearing support frame, wherein the symmetric gap is filled with a magnetorheological fluid.

The bearing support assembly of any preceding clause, wherein the bearing support frame has a first spring finger adjacent a second spring finger on the bearing support.

The bearing support assembly of any preceding clause, further comprising a gap between the bearing support frame and the bearing support.

The bearing support assembly of any preceding clause, wherein the non-axisymmetric stiffness is achieved by altering an orientation of one or more of the plurality of ribs.

The bearing support assembly of any preceding clause, wherein the plurality of ribs includes a plurality of fixed ribs and a plurality of movable ribs.

The bearing support assembly of any preceding clause, wherein the plurality of movable ribs is arranged vertically with respect to a Y-axis.

The bearing support assembly of any preceding clause, wherein the plurality of movable ribs is arranged horizontally with respect to an X-axis.

The bearing support assembly of any preceding clause, wherein a first subset of the plurality of movable ribs is arranged vertically with respect to a Y-axis and a second subset of the plurality of movable ribs is arranged horizontally with respect to an X-axis.

The bearing support assembly of any preceding clause, wherein the first subset is aligned with a twelve o'clock position and a six o'clock position and the second subset is aligned with a three o'clock position and a nine o'clock position.

The bearing support assembly of any preceding clause, wherein the first subset is aligned with a three o'clock position and a nine o'clock position and the second subset is aligned with a twelve o'clock position and a six o'clock position.

The bearing support assembly of any preceding clause, wherein one or more of the plurality of movable ribs is formed of layers of material within a base material.

The bearing support assembly of any preceding clause, wherein the non-axisymmetric stiffness is achieved by altering a cross section of the bearing support.

The bearing support assembly of any preceding clause, wherein the cross section is non-symmetric such that an outer diameter of the bearing support is ovular and an inner diameter of the bearing support is circular.

The bearing support assembly of any preceding clause, further comprising a bearing supplemental support connected between the bearing support frame and the bearing support.

The bearing support assembly of any preceding clause, wherein the bearing supplemental support comprises a plurality of members extending between the bearing support frame and the bearing support.

A compressor section of a gas turbine engine including a shaft for driving a compressor, a static frame, a bearing, and a bearing support assembly coupled between the static frame and the shaft. The bearing support assembly including a bearing support frame coupled to the static frame, a plurality of ribs connected to the bearing support frame, and a bearing support connected to the plurality of ribs and configured to support the bearing, wherein the bearing support assembly has a non-axisymmetric stiffness around a circumference of the bearing support assembly.

Although the foregoing description is directed to the preferred embodiments, it is noted that other variations and modifications will be apparent to those skilled in the art, and may be made without departing from the spirit or scope of the disclosure Moreover, features described in connection with one embodiment may be used in conjunction with other embodiments, even if not explicitly stated above.

The invention claimed is:

1. A bearing support assembly configured to support one or more bearings on a shaft, the bearing support assembly comprising:
   a bearing support frame configured to be coupled to a static frame;
   a plurality of ribs connected to the bearing support frame; and
   a bearing support connected to the plurality of ribs and configured to support a bearing of the one or more bearings,
   wherein the bearing support assembly has a non-axisymmetric stiffness varying around a circumference of the bearing support assembly, and wherein the non-axisymmetric stiffness is achieved by altering a material of one or more of the plurality of ribs.

2. The bearing support assembly of claim 1, wherein the bearing support assembly always has a non-axisymmetric stiffness around the circumference of the bearing support assembly.

3. The bearing support assembly of claim 1, wherein the bearing support assembly has a non-axisymmetric stiffness above a threshold load level and a symmetric stiffness below the threshold load level.

4. The bearing support assembly of claim 1, wherein the non-axisymmetric stiffness is a sinusoidal curve, a linear curve, a spline, or combinations thereof.

5. A bearing support assembly configured to support one or more bearings on a shaft, the bearing support assembly comprising:
   a bearing support frame configured to be coupled to a static frame;
   a plurality of ribs connected to the bearing support frame; and
   a bearing support connected to the plurality of ribs and configured to support a bearing of the one or more bearings,
   wherein the bearing support assembly has a non-axisymmetric stiffness varying around a circumference of the bearing support assembly, and
   wherein the non-axisymmetric stiffness is achieved by altering an orientation of one or more of the plurality of ribs, wherein the plurality of ribs includes a plurality of fixed ribs and a plurality of movable ribs.

6. The bearing support assembly of claim 1, wherein the plurality of ribs comprises a first subset of ribs and a second subset of ribs, and wherein a material of the first subset of ribs is different than a material of the second subset of ribs, and wherein the material of the first subset of ribs is a steel base with an aluminum deposit outer layer and the material of the second subset of ribs is a steel base with a titanium deposit outer layer.

7. The bearing support assembly of claim 1, wherein the plurality of ribs comprises a hybrid rib arrangement, and wherein the hybrid rib arrangement comprises a combination of solid ribs, hollow ribs, hollow-filled ribs, or any combination thereof.

8. The bearing support assembly of claim 1, wherein the non-axisymmetric stiffness is achieved by altering the bearing support, wherein the bearing support comprises a first bearing support separated by a gap from a second bearing support and the gap includes a first gap and a second gap, the first gap between a first distal end of the first bearing support and a first distal end of the second bearing support and the second gap between a second distal end of the first bearing support and a second distal end of the second bearing support, and wherein the bearing support is a split bearing support.

9. The bearing support assembly of claim 1, further comprising a nonsymmetric gap between the bearing support and the bearing support frame; and a material in the nonsymmetric gap, wherein the material is a viscoelastic material, a rubber material, a shape memory alloy, or combinations thereof, and wherein a first stiffness at an X-axis location is greater than a second stiffness at a Y-axis location above a threshold load level, and the first stiffness is the same as the second stiffness below the threshold load level.

10. The bearing support assembly of claim 1, further comprising a symmetric gap between the bearing support and the bearing support frame, wherein the symmetric gap is filled with a first material and a second material, the first material having a greater stiffness than that of the second material.

11. The bearing support assembly of claim 1, further comprising a symmetric gap between the bearing support and the bearing support frame, wherein the symmetric gap is filled with a magnetorheological fluid.

12. The bearing support assembly of claim 1, wherein the bearing support frame has a first spring finger adjacent a second spring finger on the bearing support; and a gap between the bearing support frame and the bearing support.

13. The bearing support assembly of claim 1, wherein the non-axisymmetric stiffness is achieved by altering a cross section of the bearing support, and wherein the cross section is non-symmetric such that an outer diameter of the bearing support is ovular and an inner diameter of the bearing support is circular.

14. The bearing support assembly of claim 1, further comprising a bearing supplemental support connected between the bearing support frame and the bearing support, wherein the bearing supplemental support comprises a plurality of members extending between the bearing support frame and the bearing support.

15. The bearing support assembly of claim 1, wherein the non-axisymmetric stiffness is achieved by altering an orientation of one or more of the plurality of ribs, wherein the plurality of ribs includes a plurality of fixed ribs and a plurality of movable ribs.

16. The bearing support assembly of claim 5, wherein one or more of the plurality of movable ribs is formed of layers of material within a base material.

17. The bearing support assembly of claim 5, wherein the plurality of movable ribs is arranged vertically with respect to a Y-axis, horizontally with respect to an X-axis, or wherein a first subset of the plurality of movable ribs is arranged vertically with respect to a Y-axis and a second subset of the plurality of movable ribs is arranged horizontally with respect to an X-axis.

18. The bearing support assembly of claim 17, wherein the first subset of the plurality of movable ribs is aligned with a twelve o'clock position and a six o'clock position and the second subset of the plurality of movable ribs is aligned with a three o'clock position and a nine o'clock position.

19. The bearing support assembly of claim 17, wherein the first subset of the plurality of movable ribs is aligned with a three o'clock position and a nine o'clock position and the second subset of the plurality of movable ribs is aligned with a twelve o'clock position and a six o'clock position.

20. A compressor section of a gas turbine engine, the compressor section comprising:
   (a) a shaft for driving a compressor;
   (b) a static frame;
   (c) a bearing; and
   (d) a bearing support assembly coupled between the static frame and the shaft, the bearing support assembly comprising:
      (i) a bearing support frame coupled to the static frame;
      (ii) a plurality of ribs connected to the bearing support frame; and
      (iii) a bearing support connected to the plurality of ribs and configured to support the bearing,
wherein the bearing support assembly has a non-axisymmetric stiffness around a circumference of the bearing support assembly, and wherein the non-axisymmetric stiffness is achieved by altering a material of one or more of the plurality of ribs.

* * * * *